United States Patent
Koyama

(10) Patent No.: US 6,912,334 B2
(45) Date of Patent: Jun. 28, 2005

(54) OPTICAL SWITCH

(75) Inventor: Tomoko Koyama, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 130 days.

(21) Appl. No.: 10/644,764

(22) Filed: Aug. 21, 2003

(65) Prior Publication Data

US 2004/0081388 A1 Apr. 29, 2004

(30) Foreign Application Priority Data

Aug. 30, 2002 (JP) ........................................ 2002-253543

(51) Int. Cl.$^7$ .............................. G02B 6/26; G02B 6/10
(52) U.S. Cl. .......................... 385/16; 385/129; 385/131
(58) Field of Search ................... 385/16, 131

(56) References Cited

U.S. PATENT DOCUMENTS

| | | | |
|---|---|---|---|
| 5,684,817 A | | 11/1997 | Houdre et al. |
| 6,738,551 B2 | * | 5/2004 | Noda et al. ................. 385/130 |
| 2004/0062505 A1 | * | 4/2004 | Sugitatsu et al. ........... 385/131 |
| 2004/0179803 A1 | * | 9/2004 | Bourelle ..................... 385/129 |

FOREIGN PATENT DOCUMENTS

JP      A 2002-022981      1/2002

* cited by examiner

*Primary Examiner*—Akm Enayet Ullah
*Assistant Examiner*—James D Stein
(74) *Attorney, Agent, or Firm*—Oliff & Berridge, PLC

(57) ABSTRACT

The invention provides an optical switch using a two-dimensional photonic crystal capable of enabling higher integration, an optical communications device and an optical communications system. An optical switch of the present invention can include a substrate, a first slab layer and a second slab layer disposed over the substrate, a third slab layer provided over the substrate and placed between the first slab layer and the second slab layer, and a phase control area provided for the first slab layer and capable of controlling the phase of light passing through the slab layer. The slab layers can include a two-dimensional photonic crystal structure, a linear defect which functions as a waveguide, a point defect for emitting light and a point defect for trapping light. The point defect for trapping light in each of the first slab layer and the second slab layer and the point defect for emitting light in the third slab layer are positioned so as to face each other. Furthermore, the point defect for emitting light in each of the first slab layer and the second slab layer and the point defect for trapping light in the third slab layer are positioned so as to face each other.

21 Claims, 12 Drawing Sheets

(A)

(B)

(A)

(B)

(A)

(B)

(A)

(B)

(A)

(B)

OPTICAL SWITCH

BACKGROUND OF THE INVENTION

1. Field of Invention

The present invention relates to an optical switch, an optical communications device and an optical communications system using a two-dimensional photonic crystal structure.

2. Description of Related Art

In recent years, there has been a growing demand for communications systems of greater capacity. Activities are prominent in developing optical components using optical communications technology capable of converting a large volume of information into predetermined optical wavebands and transmitting them via optical fibers. In particular, an optical switch serving as a control element for switching optical transmitters and receivers and /or optical fibers connecting medium is considered to be an important component in optical communications technology.

Since this optical switch can switch connections using light, it can very speedily operate and is hardly susceptive to an influence of the transmission channel unlike electricity. As such an optical switch, various types, such as a Mach-Zehnder type and a directional coupler type, have been proposed, but any of them is configured so as to process optical signals within a two-dimensional plane, so that an attempt to process a large amount of optical signals would undesirably render the planar shape larger. Thus, downsizing each optical component is desired for higher integration of a system.

SUMMARY OF THE INVENTION

The present invention intends to provide an optical switch, which enables the high integration, an optical communications device and an optical communications system using a two-dimensional photonic crystal structure.

An optical switch according to the invention can comprise a substrate, a first slab layer and a second slab layer disposed over the substrate, a third slab layer disposed over the substrate and placed between the first slab layer and the second slab layer, and a phase control area provided for any one of the first slab layer, the second slab layer and the third slab layer, and capable of controlling a phase of light passing through the slab layer. Each of the slab layers can include a two-dimensional photonic crystal structure in which low refraction index areas are arranged periodically, a liner defect that is formed in a part of the two-dimensional photonic structure and functions as a waveguide, a point defect for emitting light, which is formed within the two-dimensional photonic crystal structure, captures light of a specific wavelength from the linear defect, and emits the light, and a point defect for trapping light, which is formed within the two-dimensional photonic crystal structure, captures light of a specific wavelength, and traps the light into the linear defect.

The point defects for trapping light in each of the first slab layer and the second slab layer and the point defect for emitting light in the third slab layer are positioned so as to face each other. The point defects for emitting light in each of the first slab layer and the second slab layer and the point defects for trapping light in the third slab layer are positioned so as to face each other.

In this specification, expressions such as 'on', 'over' and 'above' not only indicate a state of 'being directly on' something but also a state of 'being above' something with a predetermined layer interposed there between.

The optical switch according to this invention can comprise a Mach-Zehnder optical switch in which the first to the third slab layers are provided on the substrate. Each of the first to the third slab layers can include the two-dimensional photonic crystal structure in which low refraction index areas are arranged periodically. Using the linear defects and the point defects formed within this two-dimensional photonic crystal structure, light is controlled to be output or not to be output.

The linear defect formed within the two-dimensional photonic crystal structure of each slab layer can include a structure appearing as if to have linearly taken out a part of the low refraction index areas 300 arranged periodically and functions as the waveguide for propagating light. In the two-dimensional photonic crystal structure, a photonic band gap formed by arranging the low refraction index areas periodically restricts propagation of light, so that light is confined within the linear defect in each slab layer.

Moreover, in any one of the slab layers, the phase control area capable of controlling the phase of light passing through the slab layer is formed. In the optical switch according to this invention, this phase control area controls the phase of light passing through the linear defect of the slab layer, so that light formed by multiplexing demultiplexed light rays of specific wavelengths can be controlled to be output and not to be output.

Furthermore, in each of the slab layers, the point defect formed within the two-dimensional photonic crystal structure has a function of capturing a light ray of a specific wavelength by using disorder of the arrangement of the low refraction index areas periodicallyperiodically. When this point defect is formed, for example, near the linear defect, it functions as the point defect for emitting light which captures light of a specific wavelength passing through the linear defect and emits the light to outside. Also, it functions as the point defect for trapping light which captures light of the specific wavelength from outside of the slab layer and traps the light into the linear defect.

In addition, in the optical switch of this invention, the third slab layer can be disposed between the first slab layer and the second slab layer, and the point defects for trapping light in each of the first slab layer and the second slab layer and the point defect for emitting light in the third slab layer are positioned so as to face each other. Consequently, light rays demultiplexed and emitted by the point defect for emitting light from the third slab layer are trapped into the first and the second slab layers from the point defects for trapping light in each of the first and the second slab layers.

Also, in the optical switch of the invention, the point defects for emitting light in each of the first slab layer and the second slab layer and the point defect for trapping light in the third slab layer are positioned so as to face each other. Consequently, light passing through the linear defects in each of the first and the second slab layers is emitted to outside of the layer by the point defect for emitting light and then trapped into the third slab layer from the point defect for trapping light in the third slab layer to be multiplexed.

The optical switch according to the invention realizes selective output of light by multiplexing demultiplexed light rays after passing along equal lengths of optical paths. Thus, the point defects are preferably arranged such that the distance from the point defect for emitting light in the third slab layer to the point defect for trapping light in the first slab layer is equal to the distance from the point defect for emitting light in the third slab layer to the point defect for trapping light in the second slab layer. Similarly, the distance from the point defect for trapping light in the third slab layer to the point defect for emitting light in the first slab layer is equal to the distance from the point defect for trapping light in the third slab layer to the point defect for emitting light in the second slab layers.

Also, the amount of light captured by the point defect for trapping light in the first slab layers is equal to the amount of light captured by the point defect for trapping light in the second slab layers. The amount of light emitted from the point defect for emitting light in first slab layers and then captured by the point defect for trapping light in the third layer is equal to the amount of light emitted from the point defect for emitting light in second slab layers and then captured by the point defect for trapping light in the third layer.

In this way, the optical switch of the invention employs a combinational functions of demultiplexing light rays by the point defect for emitting light disposed in each slab layer, multiplexing light rays by the point defect for trapping light and controlling the phase of light in the phase control area formed in the linear defect in any one of the slab layers. Consequently, the optical switch of the invention enables optical switching by controlling finally multiplexed light to be output or not to be output.

Therefore, according to the present invention, it is possible to realize an optical switch capable of achieving higher integration having a novel structure, which can selectively output light of a specific wavelength using a multi-layered structure including slab layers.

Moreover, the first slab layer and the second slab layer can include a plurality of first slab layers and a plurality of second slab layers, respectively, the point defects are formed in the plurality of first slab layers and of second slab layers so as to capture light rays of different wavelengths, the point defect corresponding to the point defect formed in each of the plurality of first slab layers and of second slab layers is formed in the third slab layer, and the first slab layer and the second slab layer each provided with a point defect for capturing light of a same wavelength are positioned so as to have a same distance from the third slab layer. With this structure, it is possible to selectively output light of each wavelength of a plurality of wavelengths.

An optical switch of the invention can include a substrate, a first slab layer and a second slab layer disposed over the substrate, and a phase control area provided for any one of the first slab layer and the second slab layer and capable of controlling a phase of light passing through the slab layer. Each of the slab layers can include a two-dimensional photonic crystal structure in which low refraction index areas are arranged periodically, and a linear defect that is formed in a part of the two-dimensional photonic crystal structure and functions as a waveguide. The first slab layer can include a plurality of first slab layers formed within the two-dimensional photonic crystal structure and includes a point defect for emitting light, which captures light of a specific wavelength from the linear defect and emits the light. The second slab layer can include a plurality of second slab layers formed within the two-dimensional photonic crystal structure and includes a point defect for trapping light, which captures light of a specific wavelength and traps the light into the linear defect. The point defect for emitting light in the first slab layer and the point defect for trapping light in the second slab layer are positioned so as to face each other.

According to the optical switch of the invention, similarly to the optical switch described above, each of the first slab layer and the second slab layer can include the two-dimensional photonic crystal structure, and the linear defect which functions as a waveguide is provided in this two-dimensional photonic crystal structure. Moreover, the first slab layer is provided with a plurality of point defects for emitting light each of which captures and emits light of the specific wavelength from the linear defect, and the second slab layer is provided with a plurality of point defects for trapping light each of which captures light of the specific wavelength and traps the light into the linear defect. Moreover, any one of the first and the second slab layers is provided with the phase control area for controlling the phase of light passing through the slab layer.

In the optical switch according to the invention, light can be incident on the first slab layer and exit from the second slab layer, for example. Specifically, when light is incident on the linear defect in the first slab layer, part of the incident light is captured by the point defect for emitting light and emitted to outside of the layer. Thus, the point defect for emitting light in the first slab layer demultiplexes the incident light.

A part of demultiplexed light ray is trapped into the linear defect in the second slab layer from the point defect for trapping light in the second slab layer so as to pass through the slab layer. The remaining demultiplexed light ray passes through the linear defect in the first slab layer. Then, the demultiplexed light ray passing through the first slab layer is emitted to outside of the layer from the point defect for emitting light and then trapped into the second slab layer from the point defect for trapping light in the second slab layer. Consequently, the demultiplexed light rays are multiplexed at the second slab layer.

At that time, the point defect for emitting light in the first slab layer and the point defect for trapping light in the second slab layer are positioned so as to face each other, and the lengths of optical paths along which the demultiplexed light rays pass through the slab layers, respectively, and then are multiplexed at the second slab layer are equal, so that the phase of each demultiplexed light ray is equal. Therefore, in the optical switch according to the invention, the phase control area controls the phase of the demultiplexed light ray passing through any one of the first and the second slab layers, so that light is selectively output using interference which occurs between the demultiplexed light rays when they get multiplexed.

Therefore, this invention also enables an optical switch capable of achieving higher integration having a novel structure, which can selectively output light of a specific wavelength using a multi-layered structure including slab layers.

An optical switch according to the invention can include a substrate, a first slab layer and a second slab layer disposed over the substrate, and a phase control area provided for any one of the first slab layer and the second slab layer and capable of controlling a phase of light passing through the slab layer. Each of the slab layers can include a two-dimensional photonic crystal structure in which low refraction index areas are arranged periodically, a linear defect that is formed in a part of the two-dimensional photonic crystal structure and functions as a waveguide, a point defect for emitting light that is formed within the two-dimensional photonic crystal structure, captures light of a specific wavelength from the linear defect and emits the light, and a point defect for trapping light that is formed within the two-dimensional photonic crystal structure, captures light of a specific wavelength and traps the light into the linear defect. The point defect for emitting light in the first slab layer and the point defect for trapping light in the second slab layer are positioned so as to face each other. The point defect for trapping light in the first slab layer and the point defect for emitting light in the second slab layer are positioned so as to face each other.

According to the optical switch of the invention, similarly to the optical switch described above, each of the first slab layer and the second slab layer can include the two-dimensional photonic crystal structure, and in this two-dimensional photonic crystal structure, the linear defect which functions as a waveguide is provided. Each of the first and the second slab layers is provided with the point defect for emitting light, which captures and emits light of the specific wavelength from the linear defect and the point defect for trapping light, which captures light of the specific wavelength and traps the light into the linear defect. In addition, any one of the first and the second slab layers is provided with the phase control area for controlling the phase of light passing through the slab layer.

In the optical switch according to the invention, for example, the first slab layer allows light to be incident thereon and to exit therefrom. More specifically, when light is incident onto the linear defect in the first slab layer, a part of the incident light is captured by the point defect for emitting light and then emitted to outside of the layer. Namely, the incident light is demultiplexed at the point defect for emitting light in the first slab layer.

A part of demultiplexed light ray is trapped into the linear defect in the second slab layer from the point defect for trapping light in the second slab layer and then passes through the slab layer. The other part of remaining demultiplexed light ray passes through the linear defect in the first slab layer. Then, the demultiplexed light ray passing through the second slab layer is emitted to outside of the layer from the point defect for emitting light and then trapped into the first slab layer from the point defect for trapping light in the first slab layer. Consequently, the demultiplexed light rays are multiplexed at the first slab layer.

At that time, the point defect for emitting light at the first slab layer and the point defect for trapping light at the second slab layer are positioned so as to face each other. Although the lengths of optical paths along which the demultiplexed light rays pass through the respective slab layers and get multiplexed at the first slab layer are different, adjusting the distance between the slab layers so as to make the phase of each demultiplexed light ray be equal, for example, allows the effective optical paths to be equal. Moreover, the lengths of the effective optical paths can be made equal by always controlling the phase of passing light using the phase control area provided in each of the first and the second slab layers. Therefore, the optical switch of this invention can also selectively output light similarly to the optical switch described above.

Therefore, according to this invention, it is also possible to realize an optical switch capable of achieving higher integration having a novel structure, which can selectively output light of a specific wavelength using a multi-layered structure including slab layers.

Moreover, in the optical switch described above of the invention, the second slab layer comprises the plurality of second slab layers, the point defects for trapping light are formed in the plurality of second slab layers so as to capture light rays of different wavelengths, and the point defects for emitting light corresponding to the point defect for trapping light formed in each of the plurality of second slab layers is formed in the first slab layer. With this structure, it is possible to selectively output light of each of a plurality of wavelengths.

Furthermore, the following modes are applicable to the optical switch of this invention.

(A) The phase control area varies the refraction index of the linear defect, thereby being capable of controlling the phase of light. With this structure, the refraction index of the linear defect can be varied so as to expedite—or delay the phase of light passing through the linear defect, thereby controlling the phase of light passing through the linear defect.

(B) The phase control area comprises a pair of electrodes and varies the refraction index of the linear defect by an electric field applied from the pair of electrodes. With this structure, an electro-optical effect is induced into the linear defect by an electric field generated with a voltage applied to the pair of electrodes, thereby varying the refraction index and controlling the phase of passing light.

(C) The phase control area comprises a heating portion and varies the refraction index of the linear defect by heat generated from the heating portion. With this structure, an electrode layer is provided, for example, and then heat generated by applying an electric current to this electrode layer is used so as to induce a thermo-optical effect toward the linear defect. Consequently, the refraction index can be varied so as to control the phase of passing light.

(D) A wavelength of captured light is different depending on a shape of the point defect. With this structure, various shapes of point defects are formed in the slab layers, thereby performing switching control on light of a targeted wavelength. In addition, in this specification, when expressions like 'various shapes' are used regarding the point defect, they indicate not only the case that the planar shapes of the point defects are different but also the case that the sizes of the point defects are different.

(E) The point defect can include a columnar structure, which is asymmetric on ups and downs. With this structure, it is possible to prevent loss of light due to leakage of light caused when light captured at the point defect is emitted or trapped.

(F) A reflecting member for reflecting the light of the specific wavelength is placed on the bottom of defects in with respect to the surface of the slab layer. With this structure, using the reflection can also prevent loss of light caused when light captured at the point defect is emitted or trapped.

(G) A cladding layer having a refraction index lower than that of a material for the slab layer is provided on each of an upper and a lower sides of each of the slab layers. With this structure, the cladding layer also allows light in the direction perpendicular in plane of the surface of the slab layer to be unfailingly confined into the linear defect.

(H) One end or both ends of the linear defect is or are closed with the low refraction index areas arranged periodically. With this structure, one end may be configured to be closed, so that the direction of outgoing light can be directed to one end side. Also, both ends may be configured to be closed, so that trapped light does not leak from the ends and is confined within the slab layer.

(I) The linear defect is positioned such that the linear defect included in the slab layer does not overlap the linear defect included in another slab layer disposed at least on an upper side or lower side of the first slab layer. With this structure, it is possible to prevent interference in the stacking direction between linear defects each of which functions as a waveguide and also to reduce the distance between the slab layers, thereby achieving a device of a smaller size.

(J) The low refraction index areas are arranged in a triangle lattice pattern or in a square lattice pattern.

(K) Each of the low refraction index areas comprises at least one of a indented section and a through hole formed in the slab layer.

(L) Moreover, the optical switch according to the invention is applicable to an optical communications device and an optical communications system with any one of the above optical switches.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Hereinafter, embodiments of the invention will be explained with reference to accompanying drawings.

Figure 1:
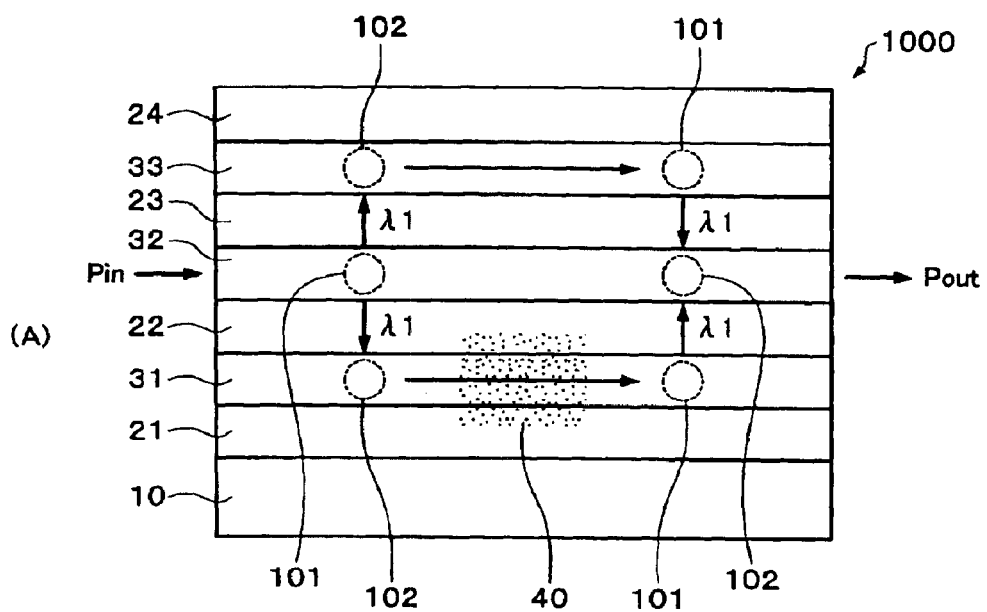
FIG. 1(A) is a sectional view schematically showing an optical switch according to the first embodiment of the invention.
FIG. 1(B) is a drawing for illustrating the function of the optical switch according to the first embodiment of the invention.
Figure 1:
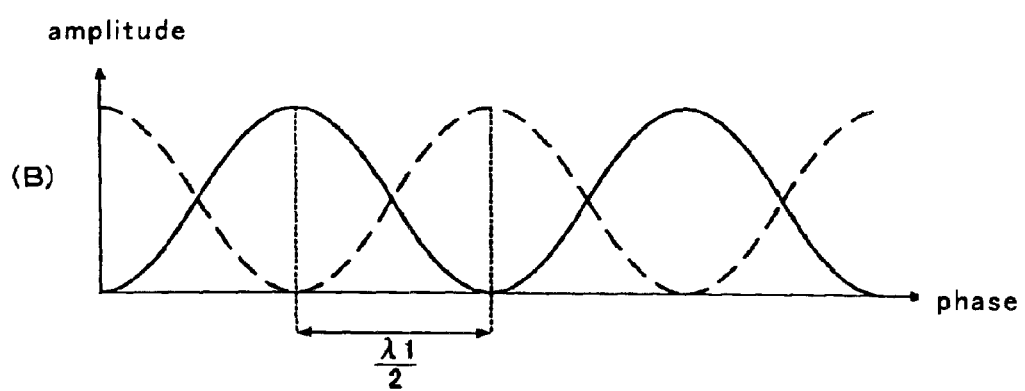

First of all, a structure of an optical switch 1000 according to the first embodiment of the invention is explained. FIG. 1(A) is a sectional view schematically showing the optical switch 1000 according to the first embodiment of the invention. The optical switch 1000 of this embodiment includes a plurality of slab layers 31 to 33 each of which is stacked on a substrate 10 and sandwiches one of cladding layers 21 to 24 and a phase control area 40 provided for the slab layer 31.

As a material for the substrate 10, for example, a semiconductor substrate, such as an Si substrate; an SOI substrate having an SiO2 layer on an Si substrate; an SiC substrate; a GaAs substrate; and an InP substrate, a glass substrate and a resin substrate may be used.

The cladding layers 21 to 24 can include a material with a refraction index lower than that of the material for the slab layers 31 to 33 and function to confine light in the direction perpendicular to the surfaces of the slab layers 31 to 33 into the slab layers 31 to 33. The material for such cladding layers 21 to 24 is determined in relation to the refraction index of the material for the slab layers 31 to 33. For example, such materials include an inorganic material of any one or any arbitrary combination of In, Ga, Al, Sb, As, Ge, Si, P, N and O, and more concretely include SiO2, SiNx, SiOxNy, AlGaAs, AlGaAsSb, InGaP and InP. Moreover, besides these materials, gas such as the air and an organic material such as polymethylmethacrylate (PMMA), an epoxy resin, a phenol resin, diallyl phthalate, phenyl methacrylate, and a fluoropolymer, for example, may be selected as the materials for the cladding layers 21 to 24. Moreover, the cladding layers 21 to 24 can be formed with a known film forming method such as spin coat method, for instance.

Figure 2:
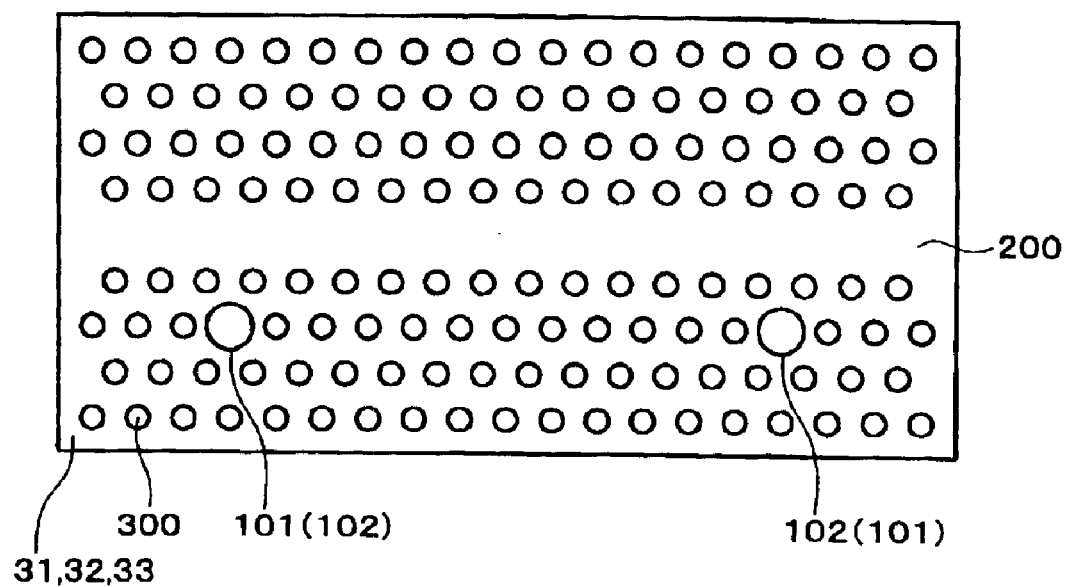
FIG. 2 is a plan view schematically showing a slab layer of the optical switch according to the first embodiment of the invention.

The slab layers 31 to 33 form a slab waveguide including a two-dimensional photonic crystal structure, such as the one shown in FIG. 2. Here, the two-dimensional photonic crystal structure indicates a structure that includes a photonic band gap within a two-dimensional plane by arranging areas in each of which a refraction index is varied (hereinafter referred to as a low refraction index area) 300 periodically. This low refraction index area 300 is formed by forming a through hole or a indented section in the slab layers 31 to 33 and filling the through hole or the indented section with a medium such as air whose refraction index is lower than that of each of the slab layers 31 to 33. In addition, the through hole or the grove is sometimes filled with the material for the cladding layers 21 to 24. The same is true of point defects 101 and 102 described in greater detail below.

Here, in the two-dimensional photonic crystal structure, the photonic band gap prohibits propagation of light in an in-plane direction. Furthermore, each of the slab layers 31 to 33 includes a linear defect 200 having a structure appearing as if to have linearly taken out a part of the low refraction index areas 300 arranged periodically in the two-dimensional photonic crystal structure. Consequently, each of the slab layers 31 to 33 functions as the slab waveguide that propagates light only through the linear defect 200. Here, due to the difference between the refraction indexes of the slab layers 31 and 32 and of the cladding layers 21 to 24, light passing through the linear defect 200 of each of the slab layers 31 to 33 is also confined and propagated in the linear defect 200 even in the direction perpendicular to the surfaces of the slab layers 31 to 33.

Figure 3:
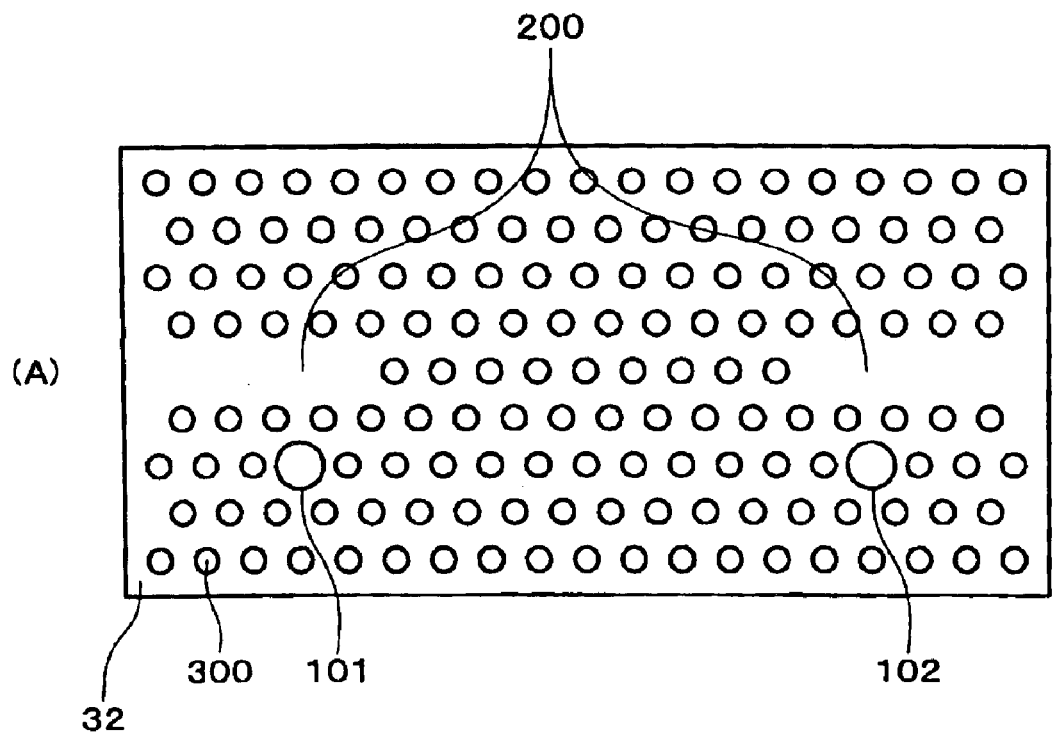
FIG. 3(A) and FIG. 3(B) are plan views schematically showing slab layers of the optical switch according to the first embodiment of the invention.
Figure 3:
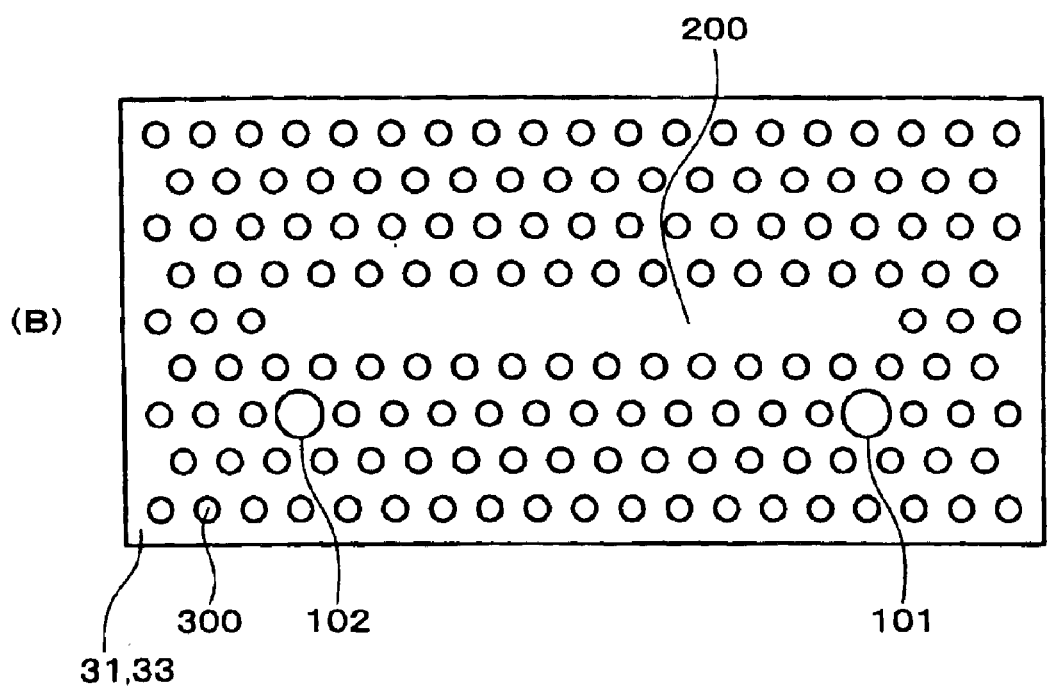

Moreover, the slab layers 31 to 33 may employ arrangements of the low refraction index areas 300 periodically as the ones shown in FIG. 3(A) and FIG. 3(B).

For example, in the slab layer 32, it is satisfactory for the linear defect 200 to be formed anywhere from one end to the point defect 101 and anywhere from the other end to the point defect 102. Therefore, as shown in FIG. 3(A), an area between the plurality of point defects 101 and 102 may be formed as a structure closed with the arranged low refraction index areas 300. With this structure, incident light and outgoing light do not interfere with each other, so that switching operation using light can be performed.

Moreover, for example, since the slab layers 31 and 33 do not need to have light incident thereon and exit therefrom, an area on each end side of the linear defect 200 may include a structure closed with the low refraction index areas arranged periodically. With this structure, in the slab layers 31 and 33, light can be propagated while reducing loss caused by emitting light in an isotropic manner from the both end sides of the linear defect 200. This structure is also effective when it is necessary to control the directions of incoming and outgoing light at the slab layer 31 and 33. Also, only one end side of each of the linear defect 200 may be formed as a structure closed with the low refraction index areas 300 arranged periodically.

Figure 4:
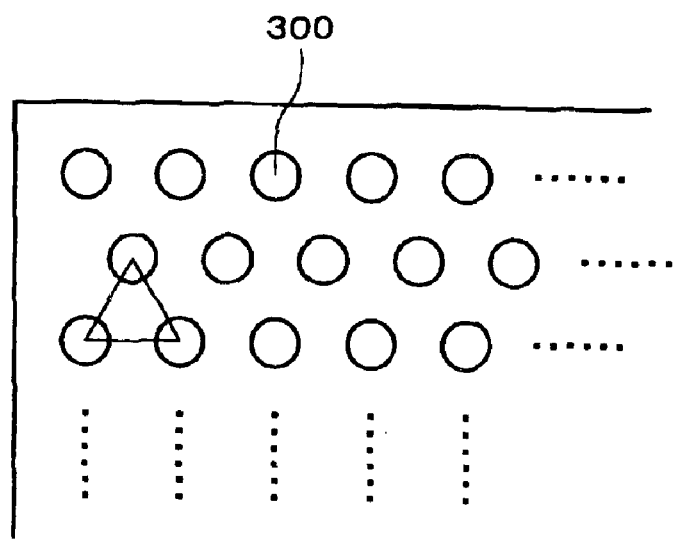
FIG. 4(A) and FIG. 4(B) are drawings for illustrating arrangements of low refraction index areas of the optical switch according to the first embodiment of the invention.
Figure 4:
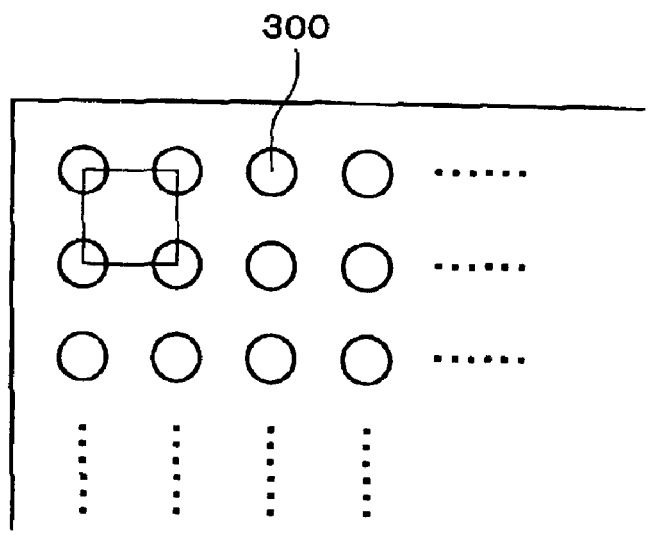

Furthermore, in the slab layers 31 to 33, it should be understood that the planar shape of the low refraction index area 300 is not limited to a circular figure as the one shown in FIG. 2 and can be a polygonal shape such as a quadrilateral and a hexagon. Also, the low refraction index areas 300 may be arranged periodically in a triangle lattice pattern or in a square lattice pattern as shown in FIG. 4(A) and FIG. 4(B).

In addition, the optical switch of this embodiment can include the point defects 101 and 102 each having a shape different from those of the low refraction index areas 300 in the two-dimensional photonic crystal structure which is formed by arranging the low refraction index areas 300 periodically in each of the slab layers 31 to 33. Consequently, light of a specific wavelength $\lambda 1$ can be captured from outside and trapped into the layer, and also the light captured within the layer can be emitted to outside. Specifically, the point defects 101 and 102 each comprise a function of capturing light passing through the linear defect 200 and emitting it to outside and a function of capturing outside light and trapping it into the linear defect 200. Each of the point defects 101 and 102 functions as the point defect for emitting light or for trapping light by exhibiting any one of the above functions in corresponding one of the slab layers 31 to 33. Here, the optical switch of this embodiment uses the point defect 101 as the point defect for emitting light and the point defect 102 as the point defect for trapping light. The 'outside' in the sense used here indicates another slab layer different from the slab layer provided with the point defects.

Sizes and planar shapes different from those of the low refraction index areas 300 are selected for the point defects 101 and 102, so that the point defects can be structured capable of capturing light of specific wavelengths corresponding to the shapes. For example, when the planar shape of the low refraction index area 300 is circular, each of the point defects 101 and 102 may have a planar shape with a radius (or diameter) different from that of the shape of the low refraction index area 300. In other words, in the optical switch 1000 according to this embodiment with the above structure, the point defects 101 and 102 in various shapes are formed in each of the slab layers 31 to 33 so as to capture light of various wavelengths corresponding to the shapes, thereby enabling switching operation using light.

Moreover, filing the point defects 101 and 102 with materials with different refraction indexes therein allows them to capture light of different wavelengths. The wavelength of light captured at each of the point defects 101 and 102 here varies depending on the size and the planar shape thereof. Thus, when materials to be filled into the point defects 101 and 102 have different refraction indexes, the effective shapes of the point defects 100 vary, thereby capturing light of different wavelengths. In that case, if materials with refraction indexes, which easily vary according to the temperature, are used as the materials to be filled into the point defects 101 and 102, for example, the optical switch 1000 is placed under temperature control using, for example, a temperature controller. Consequently, according to that temperature control, the wavelengths of light to be captured by the point defects 101 and 102 can be varied when the optical switch 1000 is used. Also, in the optical switch 1000 according to this embodiment, the point defects 101 and 102 capable of capturing predetermined wavelengths can be formed by combining change of the shapes of the point defects 101 and 102 in the slab layers 31 to 33 with changing of the materials to be filled into the inside of the point defects 101 and 102.

Figure 5:
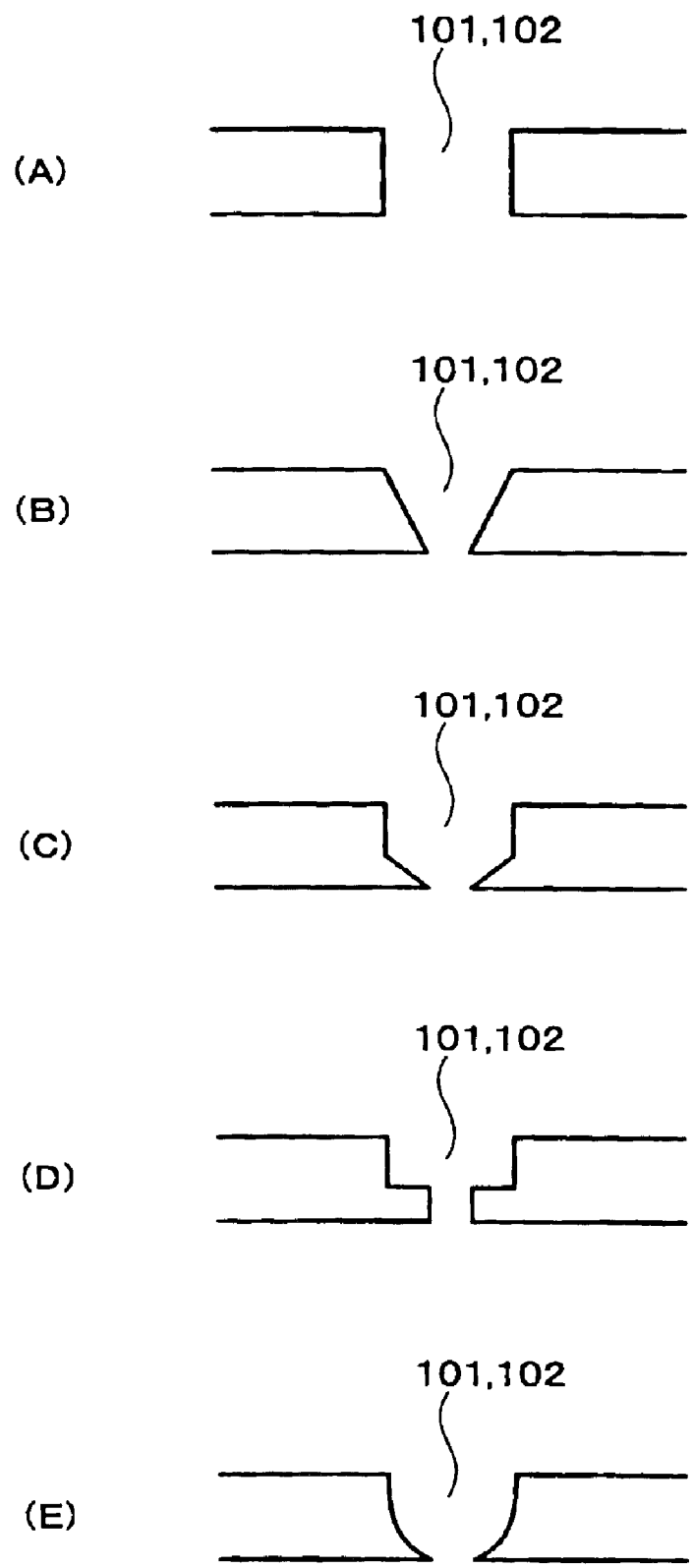
FIG. 5(A) to FIG. 5(E) are drawings schematically showing sectional shapes of point defects of the optical switch according to the first embodiment of the invention.

Furthermore, the shape of each of the point defects 101 and 102 can be of a columnar structure as shown in FIG. 5(A), for example. Moreover, when the point defects 101 and 102 are of a vertically columnar structure, which is symmetric in ups and downs as shown in FIG. 5(A), for example, captured light is vertically emitted toward ups and downs in isotropic manner when it is emitted to the outside. Thus, employing this shape, light rays demultiplexed by the point defect 101 for emitting light in the slab layer 32 can be trapped into the point defects 102 for trapping light in each of the slab layers 31 and 33 placed over and below the slab layer 32.

Moreover, when regulating the direction of light emitted from the point defect 101 for emitting light, using shapes, which are asymmetric on ups and downs as shown in FIG. 5(B) to FIG. 5(E) allows light to be emitted mostly from the wide open side. Therefore, loss of the emitted light is reduced, and switching operation using light is more precisely conducted.

Also, when using a columnar structure, which is symmetric on ups and downs as the one shown in FIG. 5(A) for the shape of each of the point defects 101 and 102, a light reflecting member is provided on either one of the opening sides (not shown in the figure). Consequently, in the point defect 101 for emitting light, reflection of the reflecting member prevents the light emitted in an isotropic manner from leaking in a direction other than the predetermined direction, and in the point defect 102 for trapping light, light is prevented from partially failing to be trapped into the linear defect 200 and then leaking therefrom. Therefore, with this structure, it is possible to prevent loss of light at the time of emitting and trapping light captured at the point defects 101 and 102 by using reflection, so that the captured light can be propagated with few losses.

Here, in the optical switch 1000 according to this embodiment, as shown in FIG. 1(A), the point defects 101 and 102 with the above characteristics are positioned so as to face each other in the slab layers 31 to 33. More concretely, the point defect 101 for emitting light in the slab layer 32 and the point defect 102 for trapping light in each of the slab layers 31 and 33 are positioned so as to face each other, and the point defect 102 for trapping light in the slab layer 32 and the point defect 101 for emitting light in each of the slab layers 31 and 33 are positioned so as to face each other.

Furthermore, as the material for the slab layers 31 to 33, for example, an inorganic material comprising any one or any arbitrary combination of In, Ga, Al, Sb, As, Ge, Si, P, N and O with a refraction index higher than that of the cladding layers 21 to 24 can be used. More specifically, examples include what is made by adding impurities including Ge to Si and SiO2, AlAs, GaAs, InGaAs, GaAsSb and InGaAsP. Moreover, as the material for the slab layers 31 to 33, for example, an organic material such as polymethylmethacrylate (PMMA), an epoxy resin, a phenol resin, diallyl phthalate, phenyl methacrylate, and a fluoropolymer with a refraction index higher than that of the material for the cladding layers 21 to 24 can be used.

Then, after a slab layers 31 to 33 are formed with a known film forming method, such as spin coat method, for example, the point defects 101 and 102 may be formed by patterning with a known method such as photolithography technique and a drawing method using electron beam so as to form the low refraction index areas 300.

Figure 6:
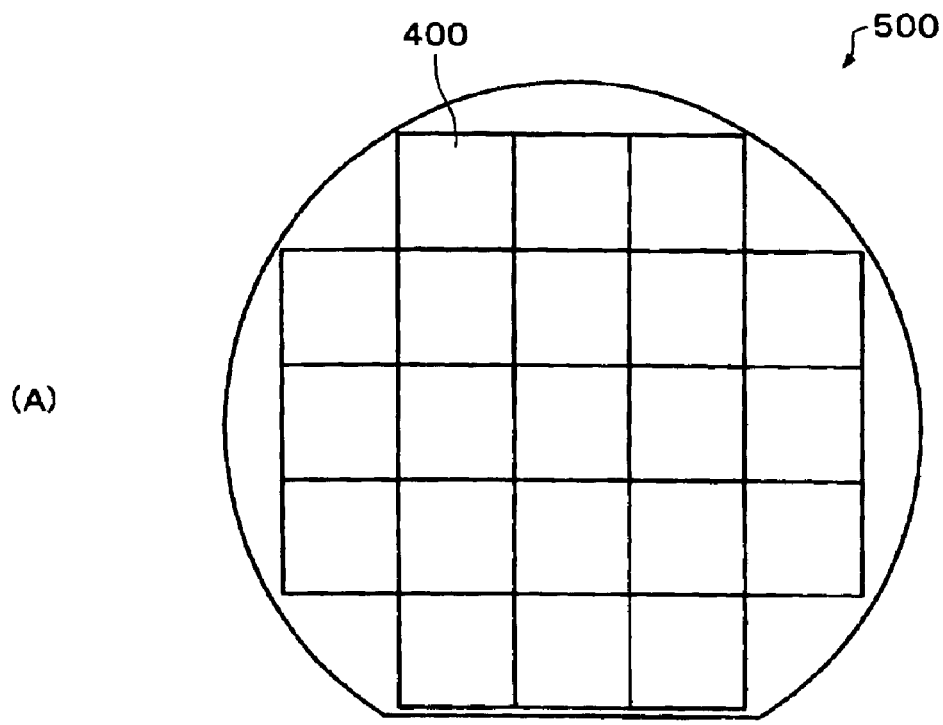
FIG. 6(A) and FIG. 6(B) are drawings for illustrating a phase control area in the optical switch according to the first embodiment of the invention.
Figure 6:
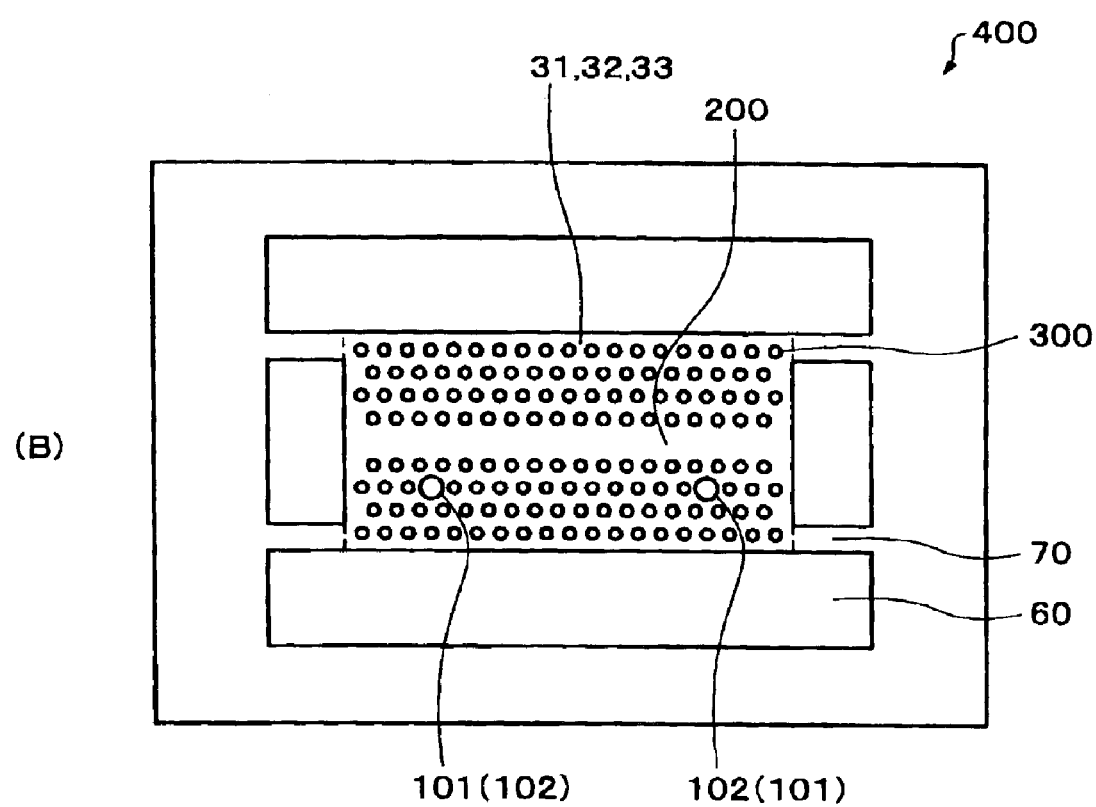

Also, each of the slab layers 31 to 33 can independently be formed. Specifically, as shown in FIG. 6(A), a single-crystal wafer 500 of Si is prepared, for example. Then, as shown in FIG. 6(B), in a predetermined area 400 of the wafer 500, the low refraction index area 300 and the point defects 101 and 102 is patterned by the drawing method using electron beam (EB) or the photolithography technique using reactive ion etching (RIE). At this time, as shown in FIG. 6(B), a pattern for separation 60, for example, can be formed at the periphery of an area for the slab layers 31 to 33 in accordance with the shape of each of the slab layers 31 to 33. Here, when the pattern for separation 60 is formed at the periphery of the area for each of the slab layers 31 to 33, it is preferable to leave a supporting area 70 for supporting the slab layers 31 to 33 so that the layers do not detach from the wafer 500 during patterning.

Next, the slab layers 31 to 33 are separated from the patterned wafer 500, for example by cleaving the supporting area 70 (the portion indicated with broken lines in the drawing) so as to be taken out. In addition, when the pattern for separation 60 is not formed unlike the above description at the periphery of the area for each of the slab layers 31 to 33, the slab layers 31 to 33 can be taken out by dicing the wafer 500 using a known method.

In this way, when the slab layers 31 to 33 are independently formed, the cladding layers 21 to 24 are formed from a material including an adhesive force such as a thermosetting resin and an ultraviolet curing resin, for example, and deposited, so that the slab layers 31 to 33 can be fixed to another layer.

Here, the method of forming each of the slab layers 31 to 33 independently is not only applicable to a case of using a semiconductor substrate such as a single crystal Si wafer, and also a synthetic resin substrate and a glass substrate may be used.

Moreover, the optical switch 1000 of this embodiment is provided with the phase control area 40 capable of changing the phase of light passing through the linear defect in the slab layer 31 to control it. Also, the phase control area 40 is not limited to being provided for the slab layer 31 and can be provided for the slab layer 33.

Figure 7:
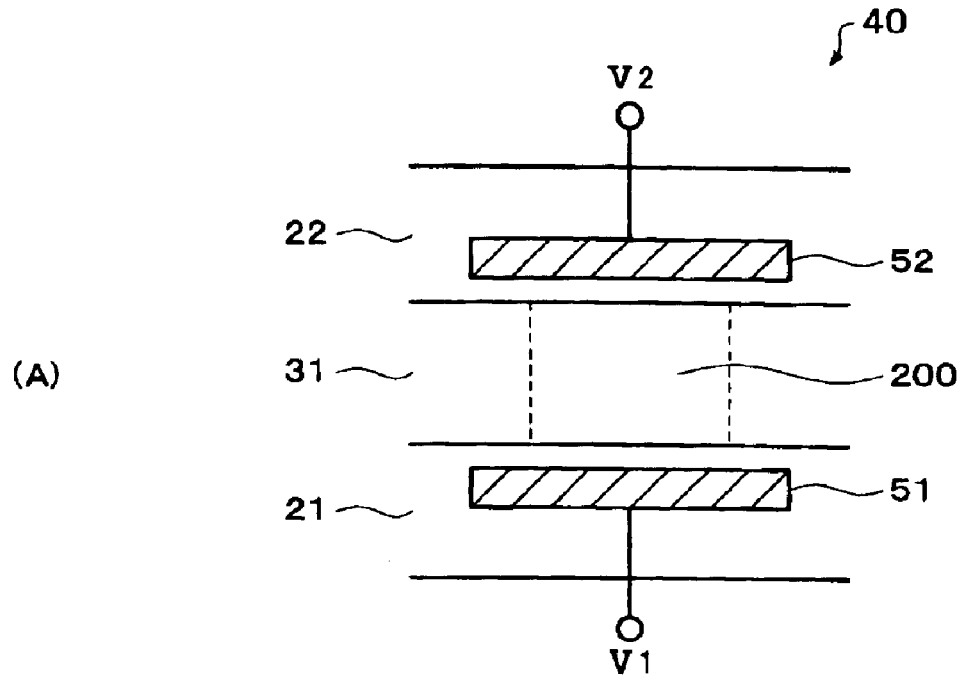
FIG. 7(A) and FIG. 7(B) are drawings for illustrating a method of forming a slab layer of the optical switch according to the first embodiment of the invention.
Figure 7:
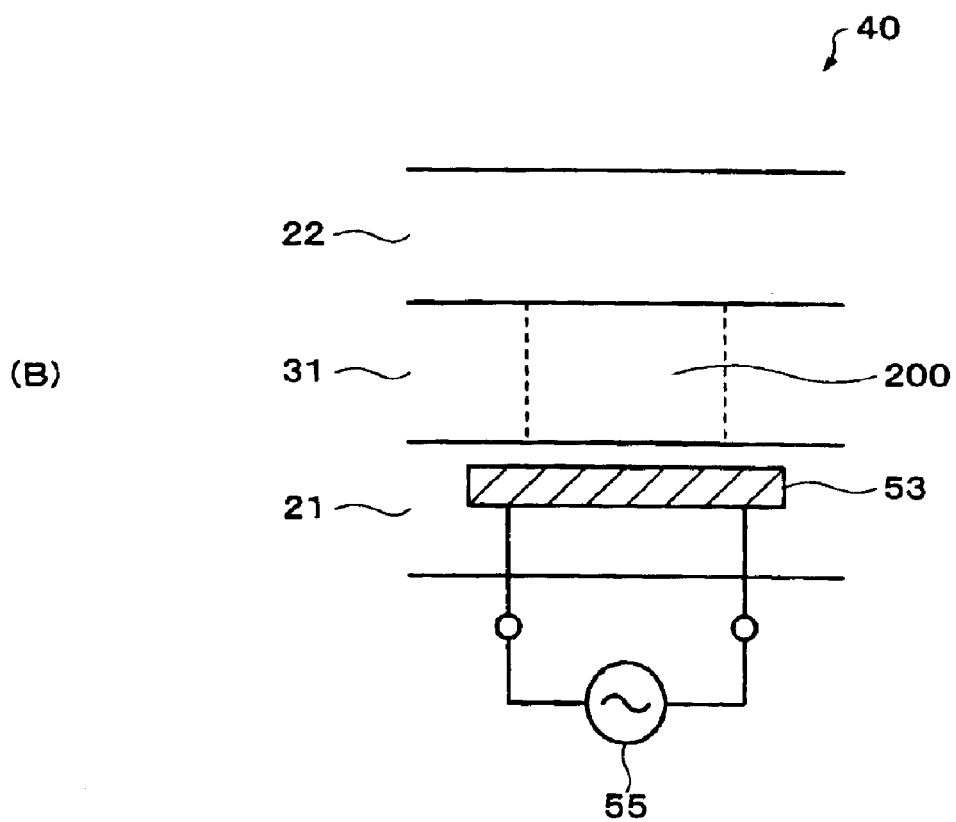

With a structure such as the ones shown in FIG. 7(A) and in FIG. 7(B), the phase control area 40 varies, for example, the refraction index of the linear defect 200 in the slab layer 31, thereby expediting or delaying the phase of light passing through the linear defect 200 in the slab layer 31 to perform its control.

The phase control area 40 can include a structure in which a pair of electrodes including electrodes 51 and 52 are positioned so that the electrodes face each other from above and below a certain area of the linear defect 200 as shown in FIG. 7(A), for example. With this structure, voltages V1 and V2 applied to the electrodes 51 and 52, respectively, cause an electric field within the linear defect 200, and the electro-optical effect causes a change in the refraction index in the area of the linear defect 200 sandwiched by the pair of electrodes. Then, this change in the refraction index can change the phase of light passing through the linear defect 200. Here, the voltages V1 and V2 applied to the electrodes 51 and 52 may be of the same potential or of different potentials. Moreover, the electrodes 51 and 52 may include a metal, an alloy and an oxide conductor as the material thereof and be formed by sputter method, for example.

Moreover, the phase control area 40 may be mounted with a heating portion including an electrode 53 above or below a certain area of the linear defect 200 as shown in FIG. 7(B), for example, and a thermo-optical effect caused by heat applied to the linear defect 200 from the heating portion can change the refraction index of the linear defect 200. More concretely, the electrode 53 is connected to a current source 55, and this current source 55 supplies a current to the electrode 53, thereby generating heat. Using this heat, the above thermo-optical effect can be generated. Also, this electrode 53 may comprise a metal, an alloy and an oxide conductor as the material thereof and be formed by sputter method, for example.

Furthermore, this embodiment employs, as the heating portion, the structure for heating the linear defect 200 using heat generated by the current running through the electrode 53. However, it should be understood that the invention is not limited thereto. For example, it is possible to perform more precise temperature control by forming a heating portion which can produce changes in temperature using Peltier effect by combining a semiconductor and a metal, for example.

Next, functions of the optical switch 1000 according to this embodiment will be explained. The optical switch 1000 of this embodiment uses the principle of operation of a Mach-Zehnder interferometer which is configured to be capable of controlling the phase difference of light rays passing along two optical paths and outputting selectively light of a predetermined wavelength $\lambda 1$.

Namely, when light Pin of the predetermined wavelength $\lambda 1$ enters from the end of the slab layer 32 in the optical switch 1000 according to this embodiment as shown in FIG. 1(A), the light of the predetermined wavelength $\lambda 1$ is captured by the point defect 101 for emitting light in the slab layer 32 and then demultiplexed and emitted in an isotropic manner in the up and down direction of the slab layer 32.

The demultiplexed light rays emitted from the point defect 101 in the slab layer 32 are trapped into each of the slab layers 31 and 33 through the point defect 102 for trapping light. Subsequently, the light trapped into each of the slab layers 31 and 33 passes through the linear defect formed in each of the layers. At that time, in the slab layer 31, the phase control area 40 controls the phase of the light passing through the linear defect in the slab layer 31. When the light of the wavelength $\lambda 1$ is output, the phase of the light is not changed and passes through the layer, and when the light of the wavelength $\lambda 1$ is not output, the light is shifted such that the phase thereof is expedited or delayed by $\lambda 1/2$ as shown in broken lines in FIG. 1(B), and then passes through the layer. Then, the light passing through the linear defect in each of the slab layers 31 and 33 is captured by the point defect 101 for emitting light provided in each of the layers and then emitted to outside of the slab layers 31 and 33.

Eventually, the light emitted from the point defect 101 for emitting light in each of the slab layers 31 and 33 is trapped into the slab layer 32 from the point defect 102 for trapping light in the slab layer 32 so as to be multiplexed. At that time, the length of an optical path of the light trapped into the slab layer 32 through the slab layer 31 and that of the light trapped into the slab layer 32 through the slab layer 33 are equal.

Here, when the phase of the light of the predetermined wavelength $\lambda 1$ emitted from the slab layer 31 has been changed by the phase control area 40, the light emitted from the slab layer 31 interferes and counteracts with the counterpart emitted from the slab layer 33 and each other. As a result, an outgoing light Pout of the predetermined wavelength $\lambda 1$ is not output from the end of the slab layer 32.

On the other hand, when the phase of the light of the wavelength $\lambda 1$ emitted from the slab layer 31 has not been changed by the phase control area 40, the light emitted from the slab layer 31 and the counterpart emitted from the slab layer 33 have the same phase. Thus, when the light rays are multiplexed, the multiplexed light is output as the outgoing light Pout of the wavelength $\lambda 1$ from the end of the slab layer 32.

In this way, according to the optical switch 1000 of the present embodiment, demultiplexing light rays by the point defect 101 for emitting light placed in the slab layer 32, multiplexing light rays by the point defect 102 for trapping light and controlling phase of light rays by the phase control area 40 provided in the slab layer 31 are combined. Hence, multiplexed light of the specific wavelength $\lambda 1$ is selectively output so as to attain light switching. Then, with the optical switch 1000 according to this embodiment, it is possible to achieve a device of a smaller size and higher integration by employing the multi-layered structure including the plurality of slab layers 31 to 33.

Figure 8:
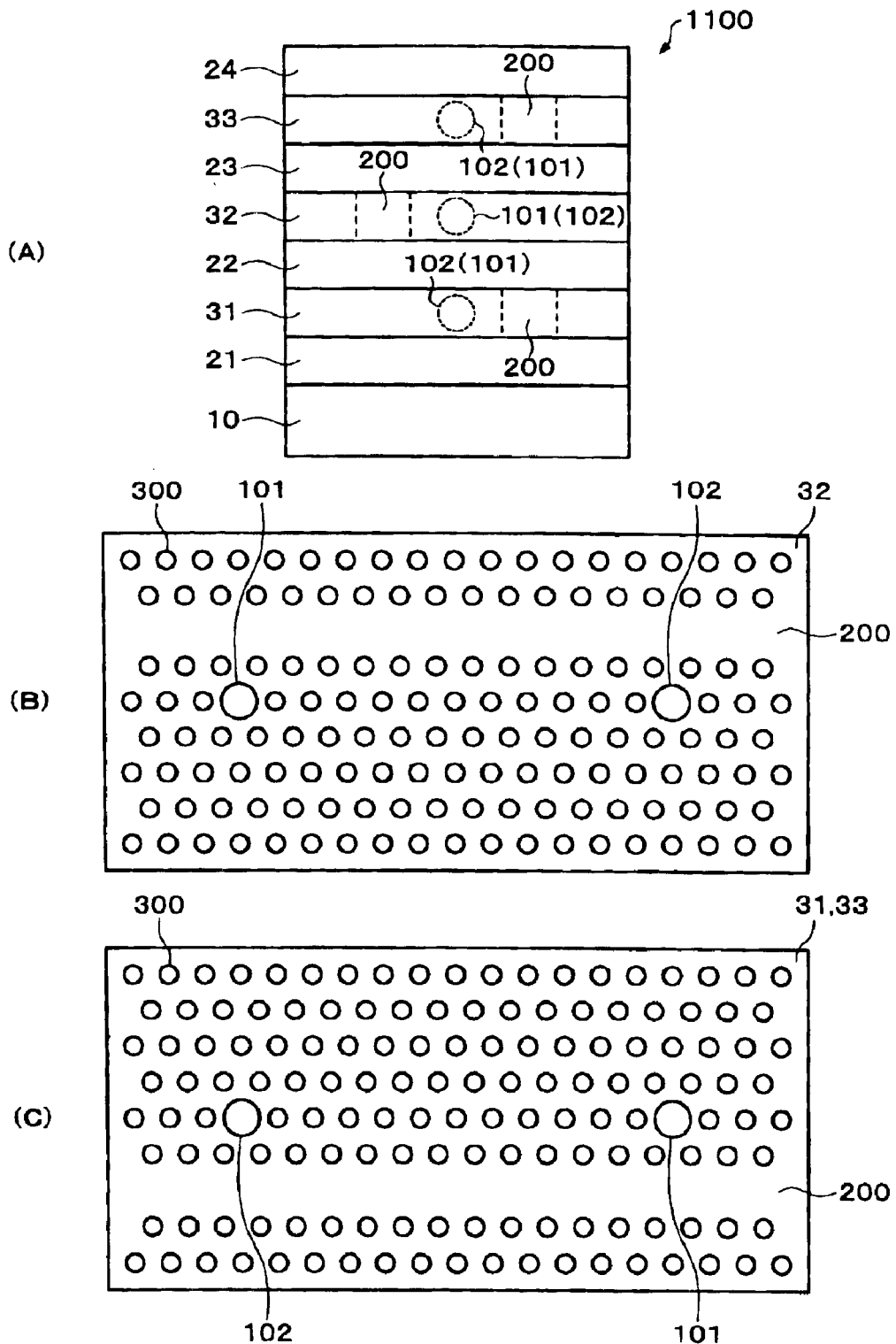
FIG. 8(A) is a sectional view schematically showing an optical switch according to a modification 1 of the first embodiment of the invention.
FIG. 8(B) and FIG. 8(C) are plan views schematically showing slab layers of the optical switch according to the modification 1 of the first embodiment of the invention.

FIG. 8(A) is a sectional view schematically showing an optical switch 1100 according to a modification 1 of the first embodiment of this invention. Here, the sectional view is the optical switch 1100 seen from the direction of incoming and outgoing light rays. Members with practically the same functions as those of the members shown in FIG. 8(A) are denoted with the same reference numerals, and a detailed explanation thereof is omitted. Also, the optical switch 1100 according to this modification may employ the same materials and forming methods as those for the optical switch 1000 according to the first embodiment.

The optical switch 1100 according to this modification is the same as the optical switch 1000 according to the first embodiment in aspects of the fundamental structure and fundamental functions. However, there is a difference in an arrangement of the linear defect 200 in each of the slab layers 31 to 33 deposited on the substrate 10. Namely, in the optical switch according to this modification, as shown in FIG. 1(A), the linear defect 200 in each of the slab layers 31 to 33 is positioned so as not to overlap another linear defect 200 in any one of the slab layers 31 to 33 placed above or below in the state that the layers are deposited. More specifically, as shown in FIG. 8(B) and FIG. 8(C), the point defects 101 and 102 in each of the slab layers 31 to 33 are positioned so as to face each other in the state that the layers are deposited. However, the linear defect 200 in each of the slab layers 31 and 33 is positioned opposite to the linear defect 200 in the slab layer 32 with the point defects 101 and 102 as the center.

Moreover, besides being positioned in parallel to each other, the linear defect 200 in each of the slab layers 31 to 33 may be positioned so as to cross over each other.

In the optical switch 1100 according to this modification, using the above structure, interference hardly occurs between the linear defects 200 in the slab layers 31 to 33, and shortening the distances between the slab layers 31 to 33 enables a device of a much smaller size and higher integration.

Figure 9:
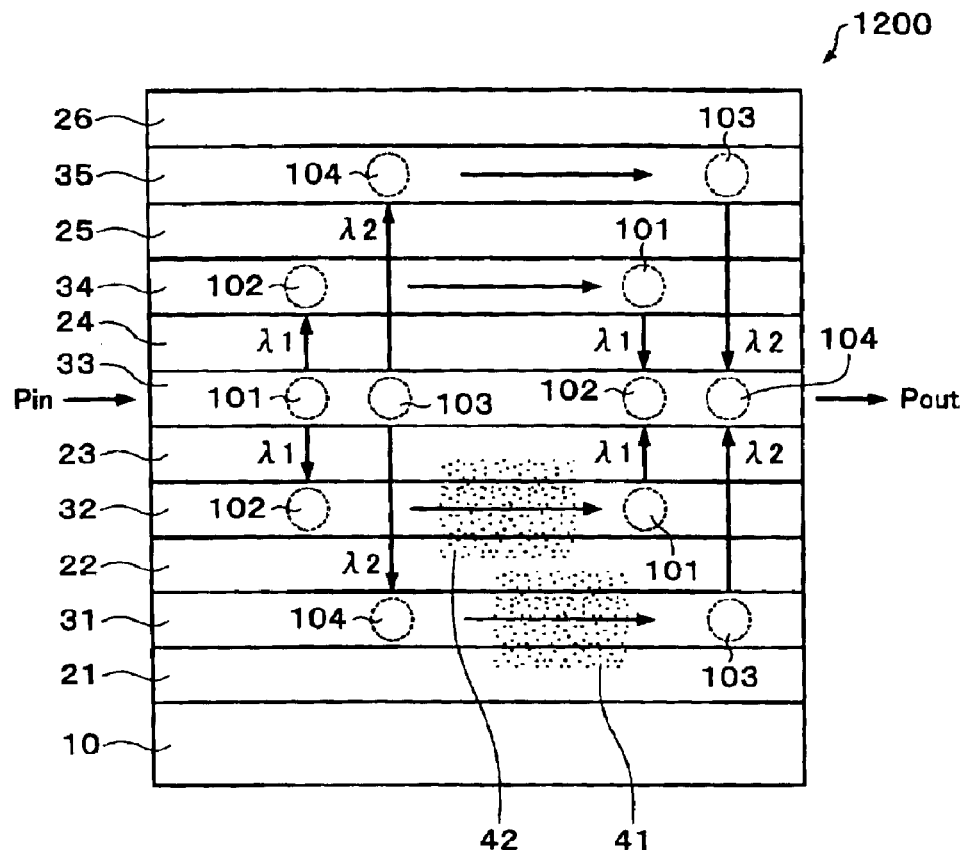
FIG. 9 is a sectional view schematically showing an optical switch according to a modification 2 of the first embodiment of the invention.

FIG. 9 is a sectional view schematically showing an optical switch 1200 according to a modification 2 of the first embodiment of the invention. Here, members practically with the same functions as those of the members shown in FIG. 1(A) are denoted with the same reference numerals, and a detailed explanation thereof is omitted. Moreover, the optical switch 1200 according to this modification can employ the same materials and forming methods as those for the optical switch 1000 according to the first embodiment.

Similarly to the optical switch 1000 according to the first embodiment, the optical switch 1200 according to this modification, as shown in FIG. 9, is configured so as to enable switching operation with respect to light of the wavelength $\lambda 1$ by using a Mach-Zehnder type optical switch comprising the slab layers 32 to 34. At the same time, the optical switch 1200 is configured so as to enable switching operation with respect to light of a wavelength $\lambda 2$ by using a Mach-Zehnder type optical switch comprising the slab layers 31, 33 and 35. The function of each of the Mach-Zehnder type optical switches is the same as that of the optical switch 1000 explained in the first embodiment.

Furthermore, the slab layer 33 is provided with the point defect 101 for emitting light of the wavelength $\lambda 1$ and with a point defect 103 for emitting light of the wavelength $\lambda 2$. It is also mounted with the point defect 102 for trapping light of the wavelength $\lambda 1$ and with a point defect 104 for trapping light of the wavelength $\lambda 2$.

Also, a plurality of the point defects 102 for trapping light of the wavelength $\lambda 1$ in each of the slab layers 32 and 34 are positioned to face each other and to keep the same distance from the point defects 101 for emitting light in the slab layer 33. Moreover, the point defect 101 for emitting light of the wavelength $\lambda 1$ in each of the slab layers 32 and 34 are positioned so as to face each other and to keep the same distance from the point defect 102 for trapping light in the slab layer 33.

In addition, the point defect 104 for trapping light of the wavelength $\lambda 2$ in each of the slab layers 31 and 35 is also positioned so as to face each other and to keep the same distance from the point defect 103 for emitting light in the slab layer 33. Also, the point defect 103 for emitting light of the wavelength $\lambda 2$ in each of the slab layers 31 and 35 is positioned so as to face each other and to keep the same distance from the point defect 104 for trapping light in the slab layer 33.

Then, the slab layers 31 and 32 are provided with phase control areas 41 and 42, respectively, capable of changing the phase of light passing through the linear defect in each of the layers. The structures shown in FIG. 7(A) and FIG. 7(B) explained in the first embodiment, for example, may be employed for the phase control areas.

In this way, with the optical switch 1200 according to this modification, it is possible to selectively output one of or both light rays of the plurality of wavelengths $\lambda 1$ and $\lambda 2$ and also to achieve a device of a much smaller size and higher integration since the optical switch is realized by comprising the multi-layered structure including the slab layers 31 to 35.

Here, with the optical switch 1200 according to this modification, light rays of three or more wavelengths can selectively be output by depositing another slab layer.

Figure 10:
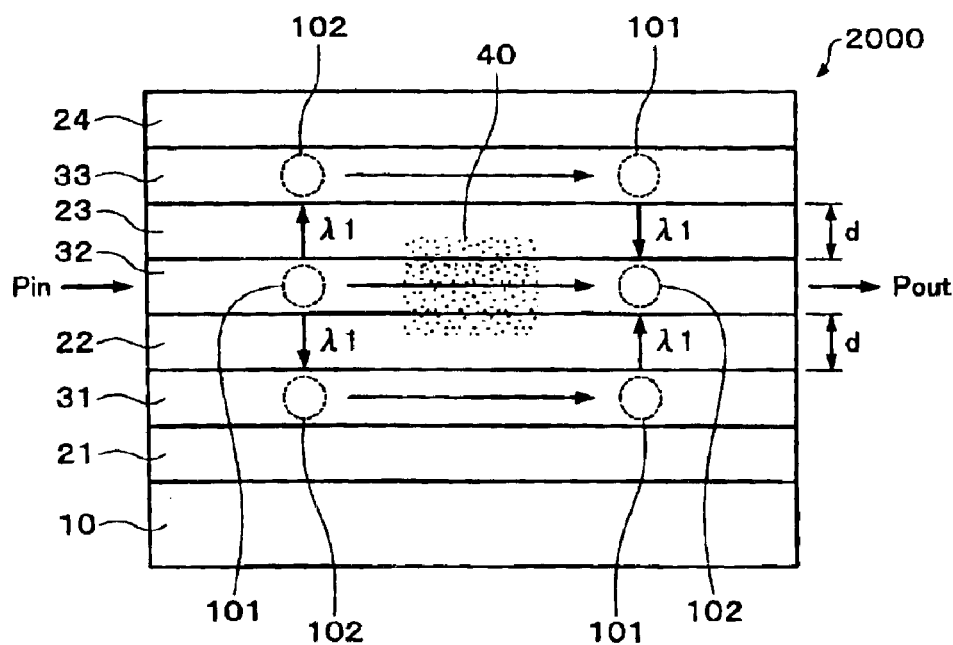
FIG. 10 is a sectional view schematically showing an optical switch according to the second embodiment of the invention.

FIG. 10 is a sectional view schematically showing an optical switch 2000 according to the second embodiment of the invention. Here, members practically having the same functions as those in FIG. 1(A) illustrated in the first embodiment are denoted with the same reference numerals, and a detailed explanation thereof is omitted. Moreover, the same materials and forming methods as those for the optical switch 1000 according to the first embodiment may be employed for the optical switch 2000 according to this embodiment.

The optical switch 2000 according to this embodiment can include the same fundamental structure as that of the optical switch 1000 according to the first embodiment. However, as shown in FIG. 10, the optical switch 2000 is different from the optical switch 1000 according to the first embodiment in that the structure allows a predetermined ratio of incoming light of a wavelength $\lambda 1$ to pass through the linear defect in the slab layer 32 and that the slab layer 32 is provided with the phase control area 40 for changing the phase of the light of the wavelength $\lambda 1$ The efficiency of optical coupling is determined according to the distance between the linear defect including the function as a waveguide and the point defect including the function of emitting light or trapping light. More specifically, the efficiency of optical coupling increases when the linear defect and the point defect are placed closer to each other while decreasing when they are placed farther to each other.

Then, in the optical switch 2000 according to the present embodiment, the point defect 101 for emitting light in the slab layer 32 is placed in a location where the efficiency of optical coupling becomes a predetermined value, so that, for example, 50% of the incoming light Pin is left within the slab layer 32 while each 25% of the remaining 50% of the light is emitted from the point defect 101 downwardly to the slab layers 31 or upwardly to the slab layer 33. In practice, the efficiency of optical coupling of the point defect 101 for emitting light in the slab layer 32 can arbitrarily be set so that the amount of light passing through the slab layer 32 is equal to the total amount of light emitted from the point defect 101 for emitting light in each of the slab layers 31 and 33 to the slab layer 32. In addition, a light reflecting film with a function of reflecting light of wavelength $\lambda 1$ (not shown in the drawing) may be provided on one side of the point defects 101 and 102 in each of the slab layers 31 and 33 in order to prevent leakage of light trapped into each layer.

Moreover, in the optical switch 2000 of this embodiment, an optical path from the point defect 101 to the point defect 102 in the slab layer 32 differs from an optical path along which light emitted from the slab layer 32 passes through the slab layers 31 and 33 and returns to the slab layer 32. More specifically, as shown in FIG. 10, when the distance between the slab layer 32 and each of the slab layers 31 and 33 is referred to as "d", a phase difference due to a difference in the optical paths of the distance "2d" occurs between the light passing through the slab layer 32 and the light passing through any one of the slab layers 31 and 33.

Therefore, in the optical switch 2000 according to this embodiment, setting the distance "2d" to be an integral multiple of the wavelength $\lambda 1$ allows the outgoing light Pout to be output when the phase control area 40 does not change the phase and allows the outgoing light Pout to be output when the phase control area 40 changes the phase of light passing through the slab layer 32 by $\lambda 1/2$.

In the optical switch 2000 according to this embodiment, on the other hand, setting the distance "2d" to be an odd multiple of $\lambda 1/2$ allows the outgoing light Pout not to be output when the phase control area 40 does not change the phase and allows the outgoing light Pout to be output when the phase control area 40 changes the phase of light passing through the slab layer 32 by $\lambda 1/2$.

As described above, with the optical switch 2000 according to this embodiment as well, it is possible to enable optical switching by selectively outputting light of the specific wavelength $\lambda 1$. Moreover, according to the optical switch 2000 of this embodiment, it is possible to achieve a device of a smaller size and higher integration by employing the multi-layered structure including the plurality of slab layers 31 to 33.

Figure 11:
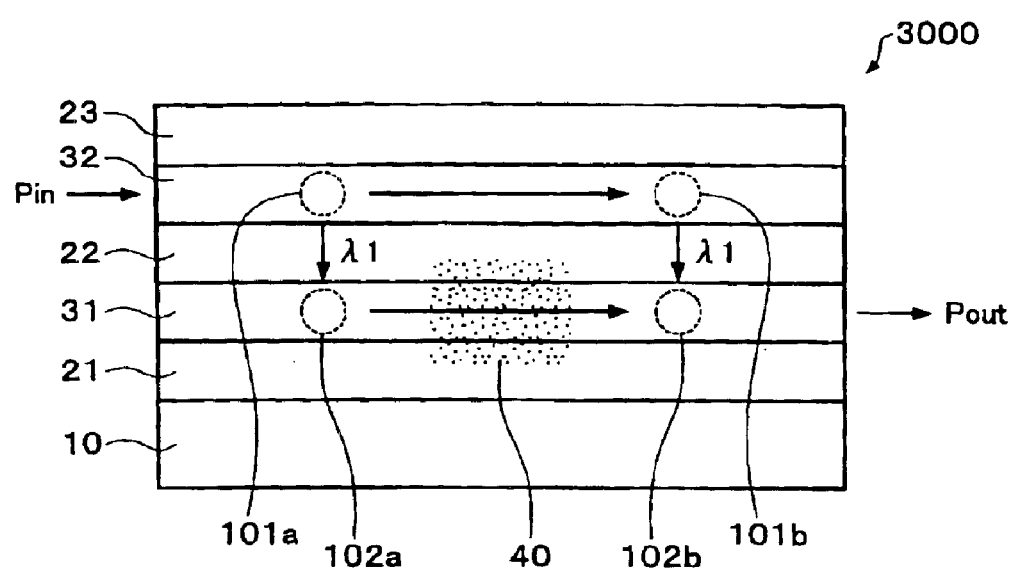
FIG. 11 is a sectional view schematically showing an optical switch according to the third embodiment of the invention.

FIG. 11 is a sectional view schematically showing an optical switch 3000 according to the third embodiment of the invention. Members with practically the same functions as those of the members explained in each of the above embodiments are denoted with the same reference numerals, and a detailed explanation thereof is omitted. Moreover, the same materials and forming methods as those for the optical switch 1000 according to the first embodiment can be employed for the optical switch 3000 according to this embodiment.

As shown in FIG. 11, in the optical switch 3000 of this embodiment, the slab layers 31 and 32 are deposited through the cladding layers 21 and 22, respectively, on the substrate 10, and the cladding layer 23 is deposited on the slab layer 32. In addition, the slab layer 31 is provided with the phase control area 40 capable of controlling the phase of light passing through the layer. This phase control area 40 can be formed in the slab layer 32 instead of being formed in the slab layer 31.

Each of the slab layers 31 and 32 comprises a linear defect and a point defect formed in the two-dimensional photonic crystal structure as with the above embodiments. However, the optical switch of this embodiment differs from the optical switches explained in the above embodiments in that in the slab layer 31, two point defects are both formed as point defects 102*a* and 102*b* for trapping light, and in the slab layer 32, two point defects are both formed as point defects 101*a* and 101*b* for emitting light.

Moreover, in the optical switch 3000 of this embodiment, an entrance and an exit of light are provided in different layers as shown in FIG. 11. Specifically, an end of the slab layer 32 is set as the entrance of light while an end of the slab layer 31 is set as the exit of light.

Figure 12:
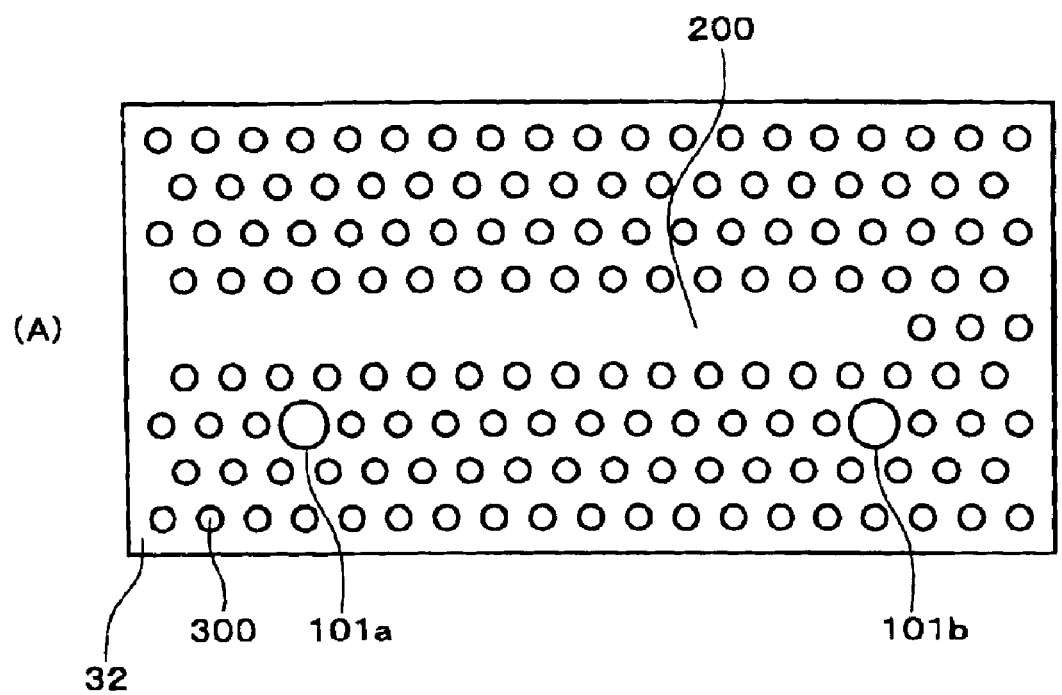
FIG. 12(A) and FIG. 12(B) are plan views schematically showing slab layers of the optical switch according to the third embodiment of the invention.
Figure 12:
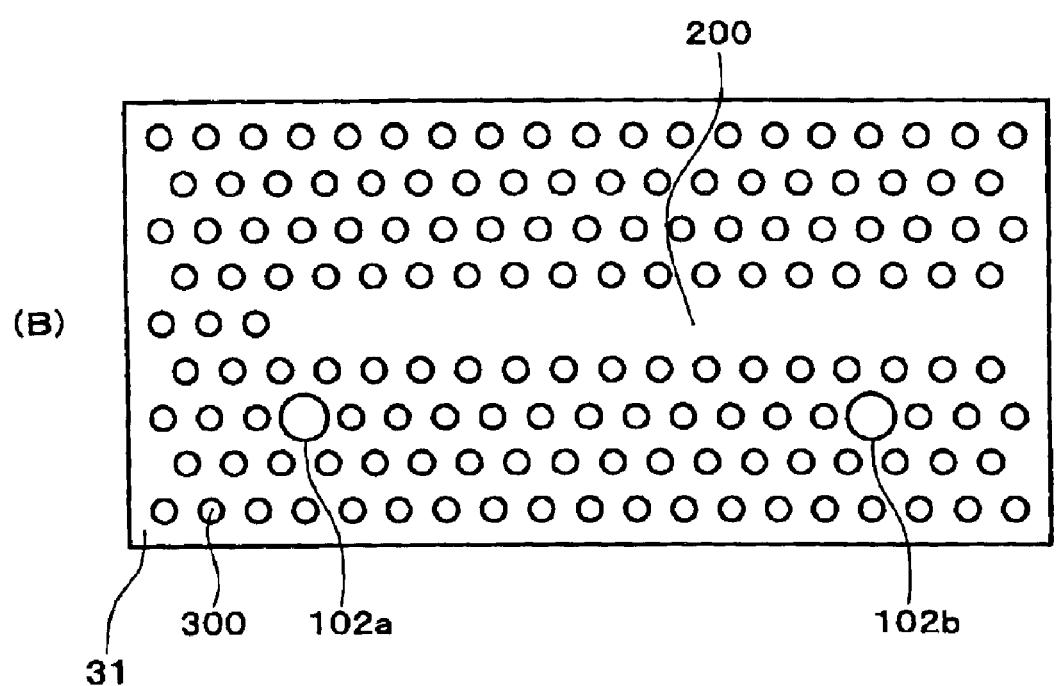

FIG. 12(A) and FIG. 12(B) illustrate examples of structures of such slab layers 31 and 32. FIG. 12(A) is a plan view schematically showing the slab layer 32. In FIG. 12(A), one end of the linear defect 200 in the slab layer 32 is formed up to an end of the slab layer 32, serving as the entrance of light. The other end of the linear defect 200 is closed with the low refraction index areas 300 by aligning them in order to keep light from leaking.

Furthermore, FIG. 12(B) is a plan view schematically showing the slab layer 31. In FIG. 12(B), one end of the linear defect 200 in the slab layer 31 is formed up to an end of the slab layer 31, serving as the exit of light. The other end of the linear defect 200 can be closed with the low refraction index areas 300 by aligning them in order to keep light from leaking.

Moreover, in the optical switch 3000 of this embodiment, it is preferable that the amount of light remaining in the slab layer 32 and that of light emitted to the outside of the slab layer 32 are the same when demultiplexing an incident light in the slab layer 32. In addition, the amount of light passing through the linear defect 200 and then captured at the point defect 101a is determined by the distance between the linear defect 200 and the point defect 101a. Thus, the linear defect 200 and the point defect 101a are placed so that the amounts of demultiplexed light rays are equal. It is preferable that the linear defect 200 and the point defects 101a and 101b are positioned such that the distance between the point defect 101b and the linear defect 200 is equal to the distance between the point defect 101a and the linear defect 200. The point defects 101a for emitting light in the slab layer 32 faces the point defect 102a for trapping light in the slab layer 31. The point defect 101b for emitting light in the slab layer 32 faces the point defect 102b for trapping light in the slab layer 31. Consequently, light can accurately be propagated between the slab layers 31 and 32. Moreover, in the slab layers 31 and 32, a light reflecting film with a function of reflecting light of the wavelength $\lambda 1$ (not shown in the drawing) may be provided on one side of the point defects 101a and 101b and on one side of the point defects 102a and 102b in the layers in order to prevent light trapped into each layer from leaking. Also, it is also advantageous that sectional shapes of the point defects 101a, 101b, 102a and 102b are asymmetric, as shown in FIG. 5(A) to FIG. 5(E).

The optical switch 3000 with the above structure can perform switching operation using light as follows.

When the light Pin of the wavelength $\lambda 1$ enters from the end of the slab layer 32, a part of the incoming light Pin is captured at the point defect 101a in the slab layer 32 and emitted to the outside of the layer, thereby demultiplexing the light. Another part of a demultiplexed light ray directly passes through the slab layer 32 and is captured by the point defect 101b to be emitted to the outside of the layer. On the other hand, the part of demultiplexed light ray is captured at the point defect 102a in the slab layer 31 and trapped into the layer and then passes through the slab layer 31. Then, the other part of the light ray emitted from the point defect 101b in the slab layer 32 is captured at the point defect 102b in the slab layer 31 and trapped into the slab layer 31, thereby being multiplexed with the part of the light ray having passed through the slab layer 31. At that time, the length of an optical path of the demultiplexed light ray passing through the slab layer 32 corresponds to the total length of the distance between the point defects 101a and 101b and the distance between the slab layers 31 and 32. The length of an optical path of the demultiplexed light ray passing through the slab layer 31 corresponds to the total length of the distance between the point defects 102a and 102b and the distance between the slab layers 31 and 32. Therefore, the length of optical path of each demultiplexed light is equal. Furthermore, the phase control area 40 controls the phase of the demultiplexed light ray passing through the slab layer 31, and the outgoing light Pout is not output when the demultiplexed light rays interfere and counteract each other at the time of multiplexing the light rays while the outgoing light Pout is output when the phases of the demultiplexed light rays are equal each other.

In this way, the optical switch 3000 according to this embodiment also enables the same switching operation of light as the optical switch 1000 according to the first embodiment. Moreover, the optical switch 3000 comprises a two-layer structure including the slab layers 31 and 32. Therefore, with this optical switch 3000, it is possible to provide a device of a much smaller size and higher integration.

Moreover, in the structure shown in FIG. 11, the point defect 101b in the slab layer 32 may be used as the point defect for trapping light and the point defect 102b in the slab layer 31 may be used as the point defect for emitting light, so as to allow light to be incident on and exit from the slab layer 32. It is also possible to enable an optical switch with the same functions as those of the optical switch 3000 of this embodiment. In that case, the lengths of the optical paths along which light rays pass through the slab layers 31 and 32, respectively, and then are multiplexed, are different. However, the distance between the slab layers 31 and 32 is adjusted so as to correct the difference in the optical paths, thereby effectively equalizing the optical paths. Also, the phase control area 40 can always control the phase of the passing light so as to correct the difference in the optical paths, thereby equalizing the effective lengths of the optical paths.

Figure 13:
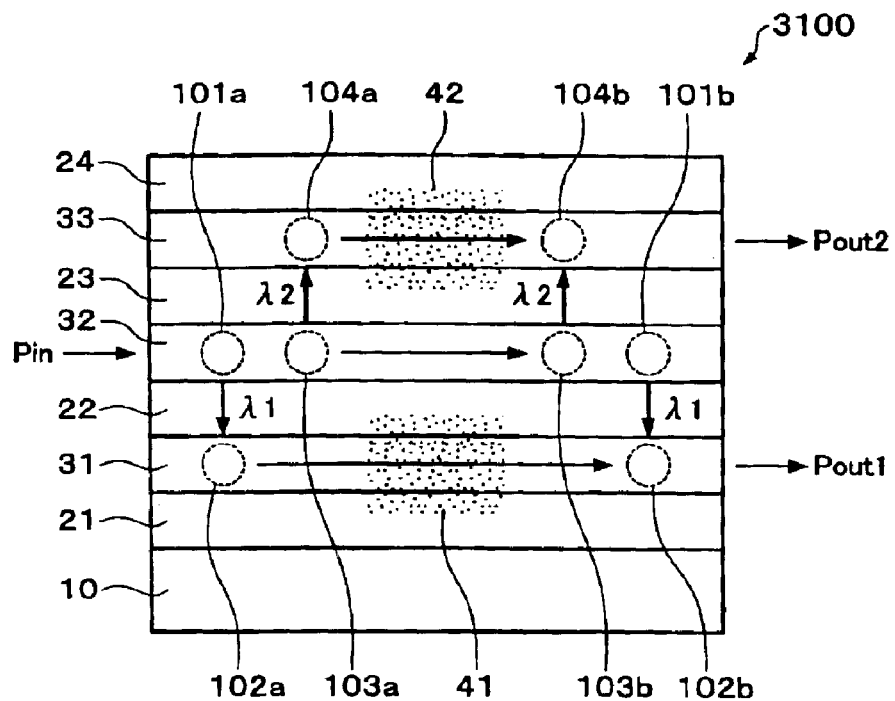
FIG. 13 is a sectional view schematically showing an optical switch according to a modification of the third embodiment of the invention.

FIG. 13 is a sectional view schematically showing an optical switch 3100 according to a modification of the third embodiment of this invention. Members with practically the same functions as those of the members described in the above embodiments are denoted with the same reference numerals, and a detailed explanation thereof is omitted. Also, the same materials and forming methods as those for the optical switch 1000 according to the first embodiment may be employed for the optical switch 3100 of this modification.

As shown in FIG. 13, this optical switch 3100 according to this modification enables switching operation with respect to light of a wavelength $\lambda 1$ by using a Mach-Zehnder type optical switch comprising the slab layers 31 and 32 and also enables switching operation with respect to light of a wavelength $\lambda 2$ by using a Mach-Zehnder type optical switch comprising the slab layers 32 and 33. The function of each of the Mach-Zehnder type optical switches is the same as that of the optical switch 3100 described in the third embodiment.

Furthermore, the slab layer 32 is provided with the point defects 101a and 101b for emitting light of the wavelength $\lambda 1$ and with point defects 103a and 103b for emitting light of the wavelength $\lambda 2$. In the slab layer $\lambda 1$, the point defects 102a and 102b for trapping light of the wavelength $\lambda 1$ are positioned so as to face the point defects 101a and 101b. In the slab layer 33, point defects 104a and 104b for trapping light of the wavelength $\lambda 2$ are positioned so as to face the point defects 103a and 103b.

In addition, the phase control areas 41 and 42 capable of changing the phases of light rays of the wavelengths $\lambda 1$ and $\lambda 2$ passing through the linear defects in the layers are formed in the slab layers 31 and 33, respectively, and the phase control areas 41 and 42 perform phase control, thereby selectively outputting any one of or both light rays of the wavelengths $\lambda 1$ and $\lambda 2$. Therefore, the optical switch 3100 according to this modification enables switching operation corresponding to light in the range of a plurality of wavelengths. Furthermore, the phase control area may be provided in the slab layer 32 instead of being formed in each of the slab layers 31 and 33.

Moreover, the optical switch 3100 according to this modification can be configured such that the incoming light Pin including light rays of the wavelengths $\lambda 1$ and $\lambda 2$ are input from the slab layer 32, the outgoing light Pout1 of the wavelength $\lambda 1$ is output from the slab layer 31, and outgoing light Pout2 of the wavelength $\lambda 2$ is output from the slab layer 32. Consequently, even when the incoming light Pin comprises a plurality of light rays in the range of various wavelengths, these light rays are demultiplexed on the basis of each wavelength so as to perform switching, thereby selectively outputting a light ray from the different slab layers.

Furthermore, the optical switch 3100 according to this modification allows light rays of three or more wavelengths to be selectively output by depositing another or more slab layers as multi layers. Also, in the structure shown in FIG. 13, the point defects 101b and 103b in the slab layer 32 may be used as the point defects for trapping light, and the point defects 102b and 104b in the slab layers 31 and 33, respectively, may be used as the point defects for emitting light, thereby allowing light to be incident and exit from the slab layer 32. Consequently, it is possible to enable an optical switch with the same functions as those of the optical switch 3100 according to this embodiment. In that case, each of the lengths of the optical paths along which light rays pass through the slab layers 31 and 33 and then are multiplexed with a light ray passing through the slab layer 32 differs from the length of the optical path along which a light ray passes through the slab layer 32 and then is multiplexed with the light rays passing through the slab layers 31 and 33. However, the distance between the slab layers 31 and 32 and the distance between the slab layers 32 and 33 are adjusted so as to correct the difference in the lengths of the optical paths, thereby effectively equalizing the lengths of the optical paths. Moreover, the phase control areas 41 and 42 always control the phase of passing light so as to correct the difference in the optical paths, thereby effectively equalizing the lengths of the optical paths.

The optical switches 1000 to 3100 according to the above first to third embodiments as well as the various modifications are applicable to various optical communications devices such as optical routers and optical switchers (not shown in the drawing), for example.

Figure 14:
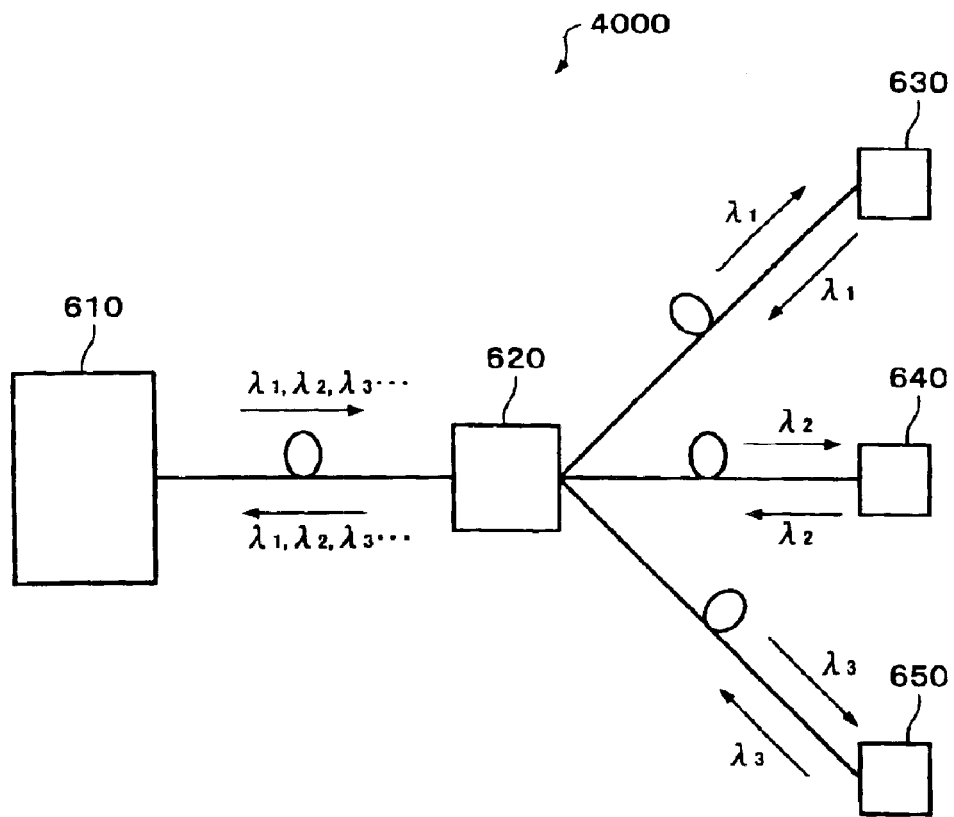
FIG. 14 is a drawing schematically showing an optical communications system according to the third embodiment of the invention.

Moreover, the optical switches 1000 to 3100 are applicable to an optical communications system 4000 as shown in FIG. 14. The optical communications system 4000 comprises a Wavelength Division Multiplexing (WDM) system that multiplexes optical signals of a plurality of wavelengths and transmits information. For example, the optical communications system 4000 comprises a base station 610, a relay station 620, and subscribers' terminals 630 to 650. The base station 610, the relay station 620 and the subscribers' terminals 630 to 650 are connected with an optical fiber.

The base station 610 can send and receive optical signals including a plurality of wavelengths ($\lambda 1$, $\lambda 2$, $\lambda 3$, . . . ). The relay station 620 demultiplexes the optical signals sent from the base station 620 and sends the demultiplexed optical signals to the subscribers' terminals. Moreover, the relay station 620 multiplexes optical signals received from the subscribers' terminals 630 to 650 and sends the multiplexed optical signals to the base station 610. Furthermore, each of the subscribers' terminals 630 to 650 is configured to be able to send and receive an optical signal in the range of wavelength allotted to itself. More concretely, the subscriber's terminal 630 sends and receives an optical signal of a wavelength $\lambda 1$, the subscriber's terminal 640 sends and receives an optical signal of a wavelength $\lambda 2$, and the subscriber's terminal 650 sends and receives an optical signal of a wavelength $\lambda 3$, thereby conducting data communications.

The above optical switches 1000 to 3100 are used within the optical communications device (not shown in the drawing) disposed in the base station 610 or in the relay station 620, and the function of switching optical signals of the optical switches 1000 to 3100 transmits a predetermined optical signal to a predetermined optical fiber.

In this way, according to the optical communications system 4000, it is possible to build optical communications systems in a varying range from relatively a large-scale communications system of, so to speak, Fiber To The Home (FTTH) system, in which communication pathways from the base station 610 to the subscribers' terminals 630 to 650 are integrated with optical fibers, to relatively a small-scale communications system such as Local Area Network (LAN).

While this invention has been described in conjunction with specific embodiments thereof, it is evident than many alternatives, modifications, and variations will be apparent to those skilled in the art. Accordingly, preferred embodiments of the invention as set forth herein are intended to be illustrative, not limiting. Various changes may be made without departing from the spirit and scope of the invention.

What is claimed is:

1. An optical switch, comprising:
    a substrate;
    a first slab layer and a second slab layer disposed over the substrate;
    a third slab layer disposed over the substrate and positioned between the first slab layer and the second slab layer; and
    a phase control area provided for any one of the first slab layer, the second slab layer and the third slab layer, and controlling a phase of light passing through the respective slab layer,
    each of the slab layers comprising:
        a two-dimensional photonic crystal structure in which low refraction index areas are arranged periodically;
        a linear defect that is formed in a part of the two-dimensional photonic structure and functions as a waveguide;
        a point defect for emitting light, which is formed within the two-dimensional photonic crystal structure, captures light of a specific wavelength from the linear defect, and emits the light; and
        a point defect for trapping light, which is formed within the two-dimensional photonic crystal structure, captures light of a specific wavelength, and traps the light into the linear defect,
    the point defect for trapping light in each of the first slab layer and the second slab layer and the point defect for emitting light in the third slab layer being positioned so as to face each other, and the point defect for emitting light in each of the first slab layer and the second slab layer and the point defect for trapping light in the third slab layer being positioned so as to face each other.

2. The optical switch according to claim 1, the first slab layer and the second slab layer comprising a plurality of first slab layers and a plurality of second slab layers, respectively;
    the point defects being formed in the plurality of first slab layers and of second slab layers so as to capture light rays having different wavelengths;
    the point defect corresponding to the point defect formed in each of the plurality of first slab layers and of second slab layers being formed in the third slab layer; and the first slab layer and the second slab layer each provided with a point defect that captures light of a same wavelength being positioned so as to have a same distance from the third slab layer.

3. An optical switch, comprising:

a substrate;

a first slab layer and a second slab layer disposed over the substrate; and a phase control area provided for any one of the first slab layer and the second slab layer, and controlling a phase of light passing through the respective slab layer, each of the slab layers comprising:
- a two-dimensional photonic crystal structure in which low refraction index areas are arranged periodically; and
- a linear defect that is formed in a part of the two-dimensional photonic crystal structure and functions as a wave guide, the first slab layer comprising a plurality of first slab layers formed within the two-dimensional photonic crystal structure and includes a point defect for emitting light that captures light of a specific wavelength from the linear defect and emitting the light, wherein the second slab layer comprises a plurality of second slab layers formed within the two-dimensional photonic crystal structure and includes a point defect for trapping light that captures light of a specific wavelength and traps the light into the linear defect, and the point defect for emitting light in the first slab layer and the point defect for trapping light in the second slab layer being positioned so as to face each other.

4. An optical switch, comprising:

a substrate;

a first slab layer and a second slab layer disposed over the substrate; and a phase control area provided for any one of the first slab layer and the second slab layer, and controlling a phase of light passing through the respective slab layer, each of the slab layers comprising:
- a two-dimensional photonic crystal structure in which low refraction index areas are arranged periodically;
- a linear defect that is formed in a part of the two-dimensional photonic crystal structure and functions as a waveguide;
- a point defect that is formed within the two-dimensional photonic crystal structure, captures light of a specific wavelength from the linear defect and emits the light; and
- a point defect that is formed within the two-dimensional photonic crystal structure, captures light of a specific wavelength and traps the light into the linear defect, the point defect that emits light in the first slab layer and the point defect that traps light in the second slab layer being positioned so as to face each other, and the point defect that traps light in the first slab layer and the point defect that emits light in the second slab layer being positioned so as to face each other.

5. The optical switch according to claim 3, the second slab layer comprising the plurality of second slab layers, the point defect for trapping light, which is formed in each of the plurality of second slab layers so as to capture a wavelength different from another wavelength captured by another point defect, and the point defect that emits light corresponding to the point defect for trapping light, which is formed in each of the plurality of second slab layers being formed in the first slab layer.

6. The optical switch according to claim 1, the phase control area being capable of controlling a phase of light by varying a refraction index of the linear defect.

7. The optical switch according to claim 6, the phase control area comprising a pair of electrodes and varying the refraction index of the linear defect by an electric field applied from the pair of electrodes.

8. The optical switch according to claim 6, the phase control area comprising a heating portion and varying the refraction index of the linear defect by heat applied from the heating portion.

9. The optical switch according to claim 1, a wavelength of captured light being different depending on a shape of the point defect.

10. The optical switch according to claim 1, the point defect comprising a vertically asymmetric columnar structure.

11. The optical switch according to claim 1, a reflecting member that reflects light of the specific wavelength being placed on the bottom of defects in with respect to the surface of the slab layer.

12. The optical switch according to claim 1, further comprising a cladding layer having a refraction index lower than that of a material for the slab layer on each of an upper and a lower sides of each of the slab layer.

13. The optical switch according to claim 1, one end or both ends of the linear defect being closed with the low refraction index areas arranged periodically.

14. The optical switch according to claim 1, the linear defect included in the slab layer being positioned not so as to overlap another linear defect in another slab layer disposed at least on an upper side or lower side of the slab layer.

15. The optical switch according to claim 1, the low refraction index areas being arranged in one of a triangle lattice pattern and in a square lattice pattern.

16. The optical switch according to claim 1, each of the low refraction index areas comprising at least one of a indented section and a through hole formed in the slab layer.

17. An optical communications device comprising the optical switch described in claim 1.

18. An optical communications system comprising the optical switch described in claim 1.

19. The optical switch according to claim 4, the second slab layer comprising the plurality of second slab layers, the point defect that traps light being formed in each of the plurality of second slab layers so as to capture a wavelength different from another wavelength captured by another point defect, and the point defect that emits light corresponding to the point defect that traps light formed in each of the plurality of second slab layers being formed in the first slab layer.

20. The optical switch according to claim 3, the phase control area being capable of controlling a phase of light by varying a refraction index of the linear defect.

21. The optical switch according to claim 4, the phase control area being capable of controlling a phase of light by varying a refraction index of the linear defect.

* * * * *